US012803627B2

(12) United States Patent
Lee et al.

(10) Patent No.: US 12,803,627 B2
(45) Date of Patent: Nov. 17, 2026

(54) HIGH-RESOLUTION PRECODER CYCLING FOR MULTIPLE-INPUT AND MULTIPLE-OUTPUT (MIMO)

(71) Applicant: QUALCOMM Incorporated, San Diego, CA (US)

(72) Inventors: Hyojin Lee, San Diego, CA (US); Yu Zhang, San Diego, CA (US); Jing Jiang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/524,281

(22) Filed: Nov. 30, 2023

(65) Prior Publication Data

US 2025/0183954 A1 Jun. 5, 2025

(51) Int. Cl.
*H04B 7/04* (2017.01)
*H04B 7/0456* (2017.01)
*H04L 5/00* (2006.01)

(52) U.S. Cl.
CPC ......... *H04B 7/0486* (2013.01); *H04L 5/0051* (2013.01)

(58) Field of Classification Search
CPC .. H04B 7/0626; H04B 7/0456; H04B 7/0639; H04B 7/0486; H04L 5/0048; H04L 5/0023; H04L 5/0051
See application file for complete search history.

(56) References Cited

U.S. PATENT DOCUMENTS

2017/0134080 A1 5/2017 Rahman et al.
2019/0280901 A1 9/2019 Nammi et al.
2023/0120035 A1 4/2023 Taherzadeh Boroujeni et al.
2023/0208493 A1* 6/2023 Abebe .................. H04B 7/0628 370/329
2024/0089068 A1 3/2024 Chun et al.
2025/0132788 A1* 4/2025 Davydov ............. H04B 7/0478
2025/0337473 A1* 10/2025 Kasi .................... H04L 27/2636

OTHER PUBLICATIONS

International Search Report and Written Opinion—PCT/US2024/052579—ISA/EPO—Feb. 10, 2025.

Nokia, et al., "On the Support of Open-loop Transmission in NR", 3GPP TSG RAN WG1#88 bis, R1-1705953, 3rd Generation Partnership Project, Mobile Competence Centre, 650, Route Des Lucioles, F-06921 Sophia-Antipolis Cedex, France, vol. RAN WG1, No. Spokane, WA, USA, Apr. 3, 2017-Apr. 7, 2017, 6 Pages, Apr. 2, 2017, XP051244062, Section 2.1.

* cited by examiner

*Primary Examiner* — Shukri Taha
(74) *Attorney, Agent, or Firm* — Patterson & Sheridan, L.L.P/QUALCOMM INCORPORATED

(57) ABSTRACT

Certain aspects of the present disclosure provide a method for wireless communications at a user equipment (UE). The UE may receive configuration information indicating that each symbol is precoded with at least one precoding matrix. The at least one precoding matrix is based on at least one beam and at least one co-phasing parameter associated with the at least one beam. The precoded symbol is mapped to different resources associated with demodulation reference signal (DMRS) ports associated with an antenna array in a cycling set. The UE may receive multiple DMRSs from multiple resources, in accordance with the configuration information.

27 Claims, 16 Drawing Sheets

700

PRGs for different PRB bundling sizes

| Bundling size | Min | Max |
|---|---|---|
| 2 | 12 | 138 |
| 4 | 8 | 69 |
| Wideband | 1 | 1 |

FIG. 7

1200

Example Precoding Matrices ( X+ and X-) For Different Ranks

| Rank 2 | Rank 3 | Rank 4 |
|---|---|---|
| $\boldsymbol{X}_+ = [\boldsymbol{x}\ \boldsymbol{x}']$<br>$\boldsymbol{X}_- = [\boldsymbol{x}\ \ -\boldsymbol{x}']$,<br>where $\boldsymbol{x} = \boldsymbol{x}'$ or $\boldsymbol{x}^H\boldsymbol{x} = 1$ | $\boldsymbol{X}_+ = [\boldsymbol{x}\quad \boldsymbol{x}'\quad \boldsymbol{x}]$<br>$\boldsymbol{X}_- = [\boldsymbol{x}\quad \boldsymbol{x}'\ -\boldsymbol{x}]$<br>where $\boldsymbol{x}^H\boldsymbol{x}' = 1$ | $\boldsymbol{X}_+ = [\boldsymbol{x}\quad \boldsymbol{x}'\ \ \boldsymbol{x}\ \ \boldsymbol{x}']$<br>$\boldsymbol{X}_- = [\boldsymbol{x}\quad \boldsymbol{x}'\ -\boldsymbol{x}\ -\boldsymbol{x}']$<br>where $\boldsymbol{x}^H\boldsymbol{x}' = 1$ |

FIG. 12

HIGH-RESOLUTION PRECODER CYCLING FOR MULTIPLE-INPUT AND MULTIPLE-OUTPUT (MIMO)

BACKGROUND

Field of the Disclosure

Aspects of the present disclosure relate to wireless communications, and more particularly, to techniques for managing precoder cycling for multiple-input and multiple-output (MIMO) systems.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes receiving configuration information indicating that each symbol is precoded with at least one precoding matrix, wherein the at least one precoding matrix is based on at least one beam and at least one co-phasing parameter associated with the at least one beam, and wherein the precoded symbol is mapped to different resources associated with demodulation reference signal (DMRS) ports associated with an antenna array in a cycling set; and receiving multiple DMRSs from multiple resources, in accordance with the configuration information.

Another aspect provides a method for wireless communications at a network entity. The method includes transmitting configuration information indicating that each symbol is precoded with at least one precoding matrix, wherein the at least one precoding matrix is based on at least one beam and at least one co-phasing parameter associated with the at least one beam, and wherein the precoded symbol is mapped to different resources associated with DMRS ports associated with an antenna array in a cycling set; and transmitting multiple DMRSs from multiple resources, in accordance with the configuration information.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 7 depicts an example table showing different numbers of physical resource block groups (PRGs) for different physical resource block (PRB) bundling sizes.

FIG. 12 depicts example candidate precoding matrices for different transmission ranks.

DETAILED DESCRIPTION

Figure 1:
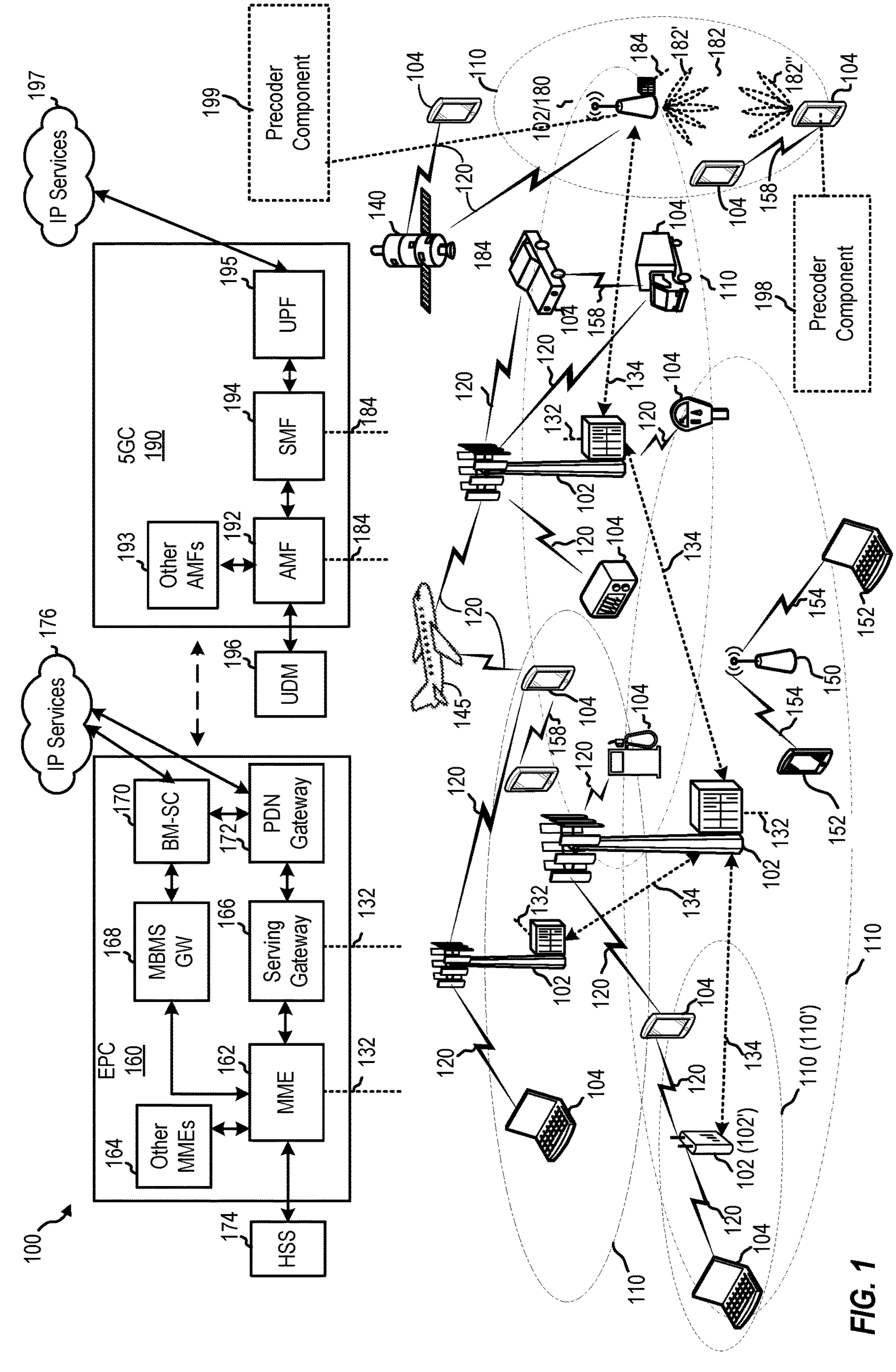
FIG. 1 depicts an example wireless communications network.

Aspects of the present disclosure provide apparatuses, methods, processing systems, and computer-readable mediums for managing precoder cycling for multiple-input and multiple-output (MIMO) systems.

MIMO is a multi-antenna technology that exploits multipath signal propagation so that information-carrying capacity of a wireless link can be increased by using multiple antennas at a transmitter and a receiver to support multiple simultaneous streams. At a multi-antenna transmitter, a precoding technique (e.g., scaling the respective streams' amplitude and phase) is typically applied based on channel state information (CSI). At a multi-antenna receiver, different spatial signatures of the respective streams can enable the separation of these streams from one another.

Demodulation reference signals (DMRSs) may be used to estimate a radio channel. DMRS signals may be present in resource blocks (RBs) allocated for a physical downlink shared channel (PDSCH). The DMRS structure is designed to support different deployment scenarios and use cases. For example, one front-loaded DMRS structure is designed to support low-latency transmissions, twelve orthogonal antenna ports for MIMO transmissions, and up to four reference signal transmission instances in a slot to support high-speed scenarios.

Precoding generally refers to a beamforming scheme to support multi-layer transmission in a MIMO system. Using precoding, multiple streams are transmitted from transmit antennas with independent and appropriate weighting per antenna such that throughput is optimized at a receiver. New radio (NR) may support a spatial multiplexing mode with channel independent (open-loop) precoding in a form of precoder cycling. For example, a transmitter may cycle through four precoders to precode different sets of four baseband symbol vectors to be transmitted. The precoders map symbol vectors to precoded baseband symbol vectors through a matrix-vector multiplication operation. The elements of a precoded baseband symbol have a one-to-one correspondence to the transmit antenna ports. Each precoded baseband symbol vector is thereafter transmitted over one of MIMO channels. In some cases, cycling may be achieved by precoding a first symbol with a first precoding matrix, a second symbol with a second precoding matrix, a third symbol with a third precoding matrix, and a fourth symbol with a precoding matrix, and then using these four precoding matrices for the next four symbols and so forth.

In some cases, a resource block group (RBG)-level precoder cycling may be implemented. An RBG generally defines a set of RBs of a given size. There are several potential challenges associated with the RBG-level precoder cycling. For instance, to achieve a full precoder cycling based on the RBG-level precoder cycling, a large number of RBGs may be required, which may not be desirable.

Techniques described herein provide MIMO schemes applied with a higher (finer) granularity, for example, at a resource element (RE)/RB-level precoder cycling. For example, the RE/RB-level precoder cycling may be implemented such that different polarizations may apply a same precoding vector and cross polarization co-phasing values may be cycled at the RE/RB-level. In some cases, each DMRS port for DMRS transmissions may also be associated with one precoding vector and one polarization. By supporting a higher resolution precoder cycling, aspects of the present disclosure may help increase transmit diversity.

In some cases, the RE-level precoder cycling may be selected and implemented to provide a better performance than the RB-level precoder cycling (e.g., in cases where an interference issue is not taken into consideration while selecting the RE or RB-level precoder cycling). However, in certain cases, the RB-level precoder cycling may be preferred for selection, since is better for a UE to reconstruct the interference since precoding is not varying at the RE-level. For example, without the RE-level precoder cycling, interference may be varying at the RB-level.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
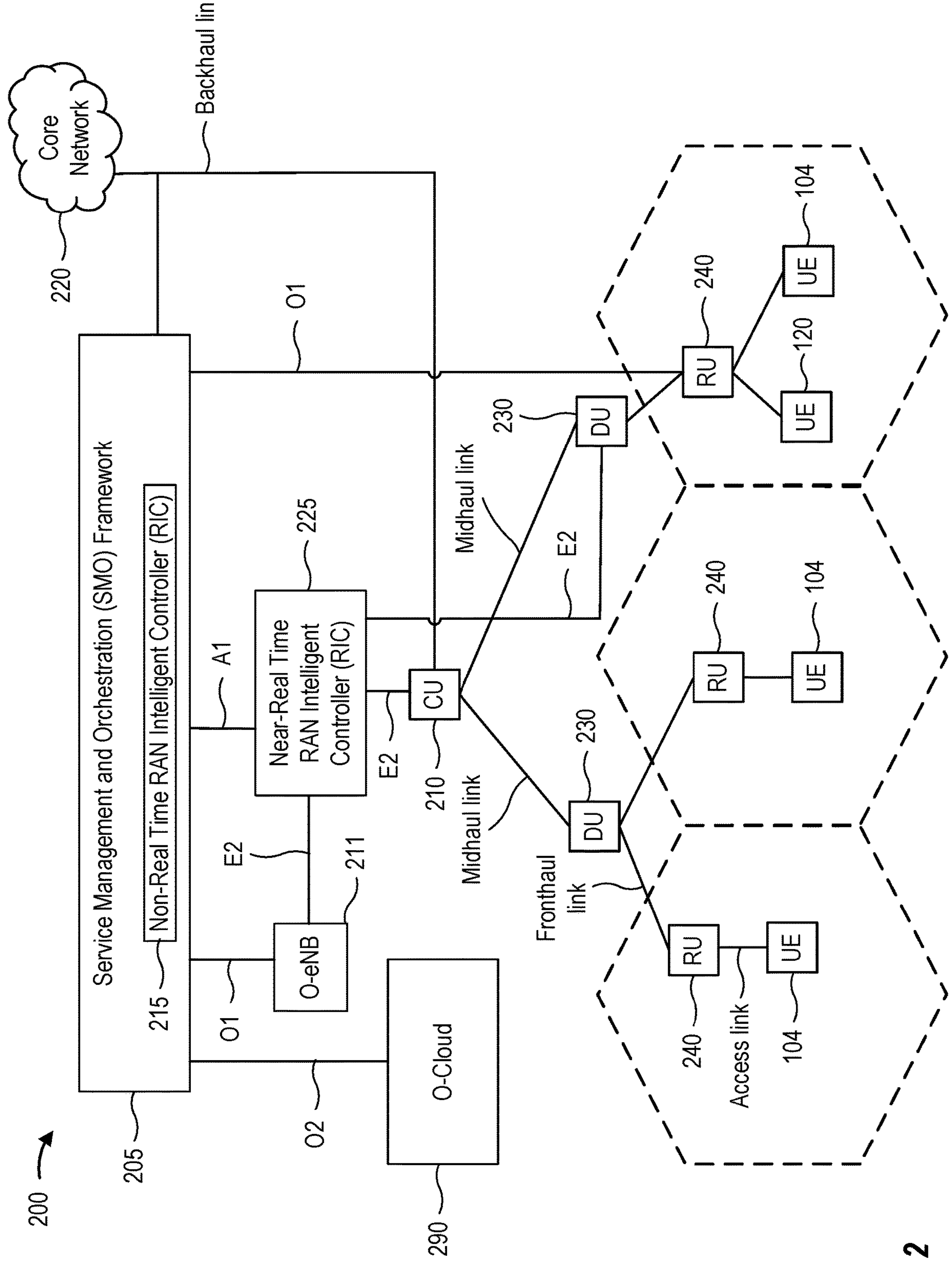
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (sMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 13:
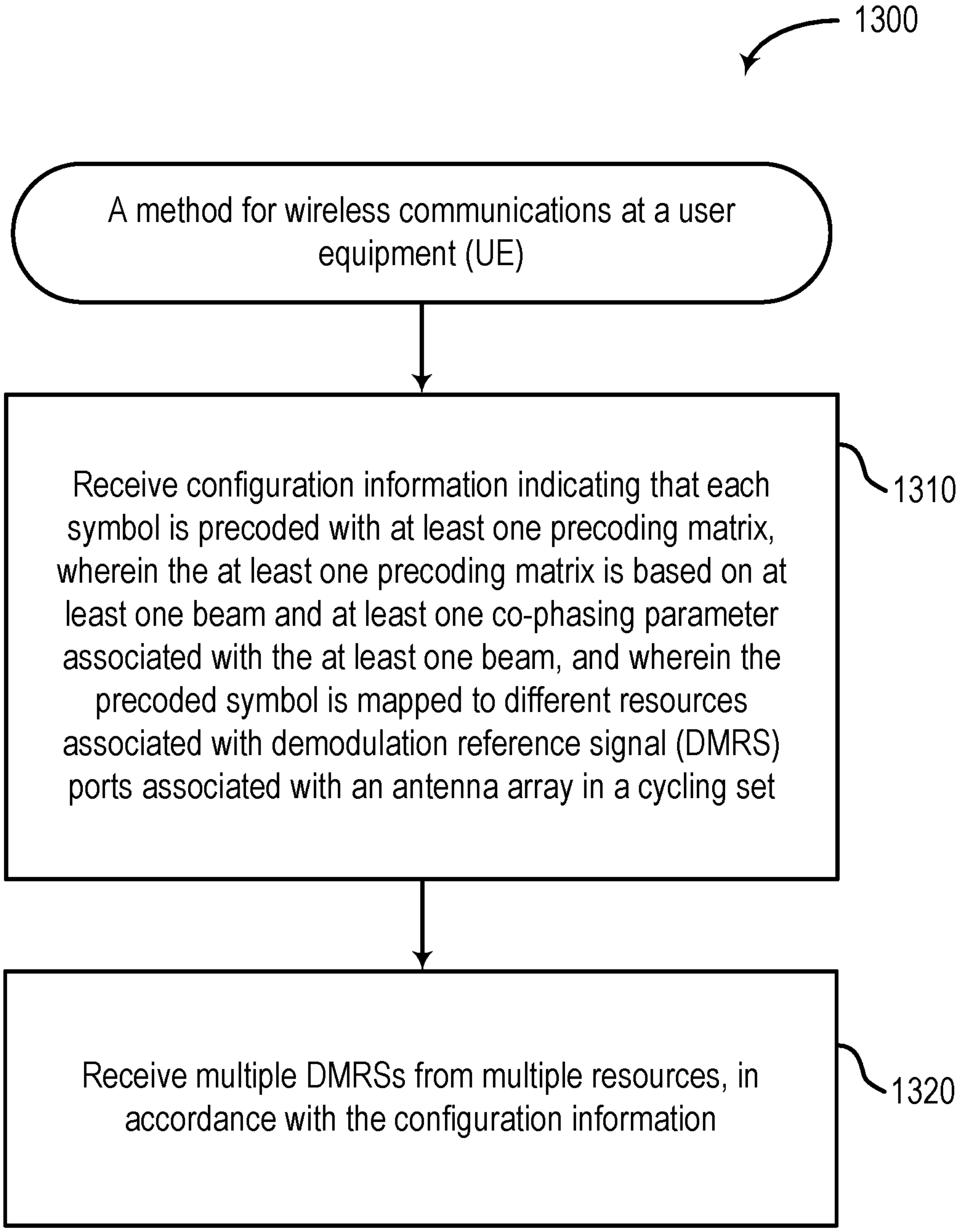
FIG. 13 depicts a method for wireless communications at a UE.

Wireless communication network 100 further includes precoder component 198, which may be configured to perform method 1300 of FIG. 13. Wireless communication network 100 further includes precoder component 199, which may be configured to perform method 1400 of FIG. 14.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (sMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the sMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The sMO Framework 205 may be configured to support RAN deployment and provisioning of non-virtualized and virtualized network elements. For non-virtualized network elements, the sMO Framework 205 may be configured to support the deployment of dedicated physical resources for RAN coverage requirements which may be managed via an operations and maintenance interface (such as an O1 interface). For virtualized network elements, the sMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the sMO Framework 205 can communicate with a hardware aspect of a 4G RAN, such as an open eNB (O-eNB) 211, via an O1 interface. Additionally, in some implementations, the sMO Framework 205 can communicate directly with one or more RUs 240 via an O1 interface. The sMO Framework 205 also may include a Non-RT RIC 215 configured to support functionality of the sMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the sMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the sMO Framework 205 (such as reconfiguration via O1) or via creation of RAN management policies (such as A1 policies).

Figure 3:
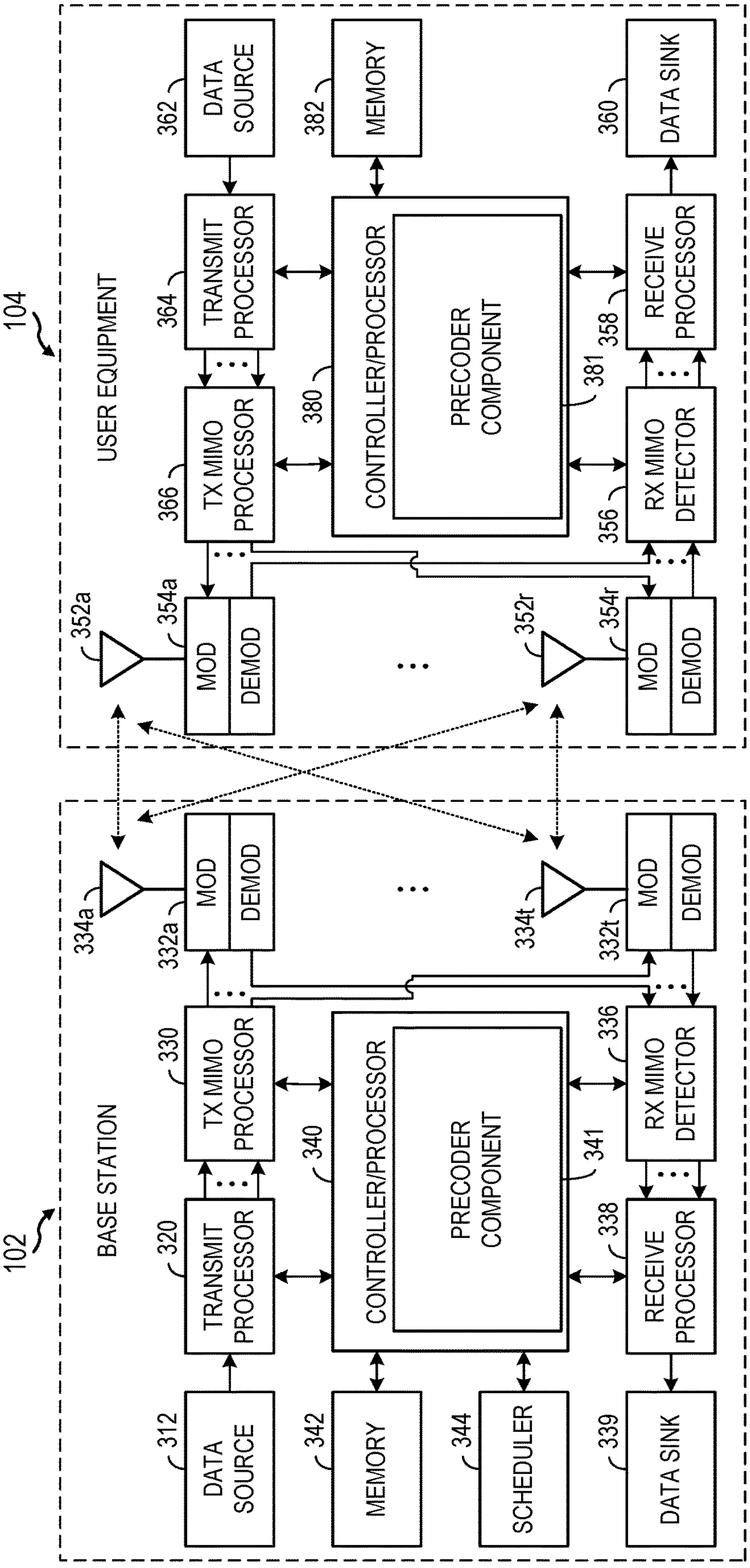
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes precoder component 341, which may be representative of precoder component 199 of FIG. 1. Notably, while depicted as an aspect of controller/processor 340, precoder component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes precoder component 381, which may be representative of precoder component 198 of FIG. 1. Notably, while depicted as an aspect of controller/processor 380, precoder component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4A:
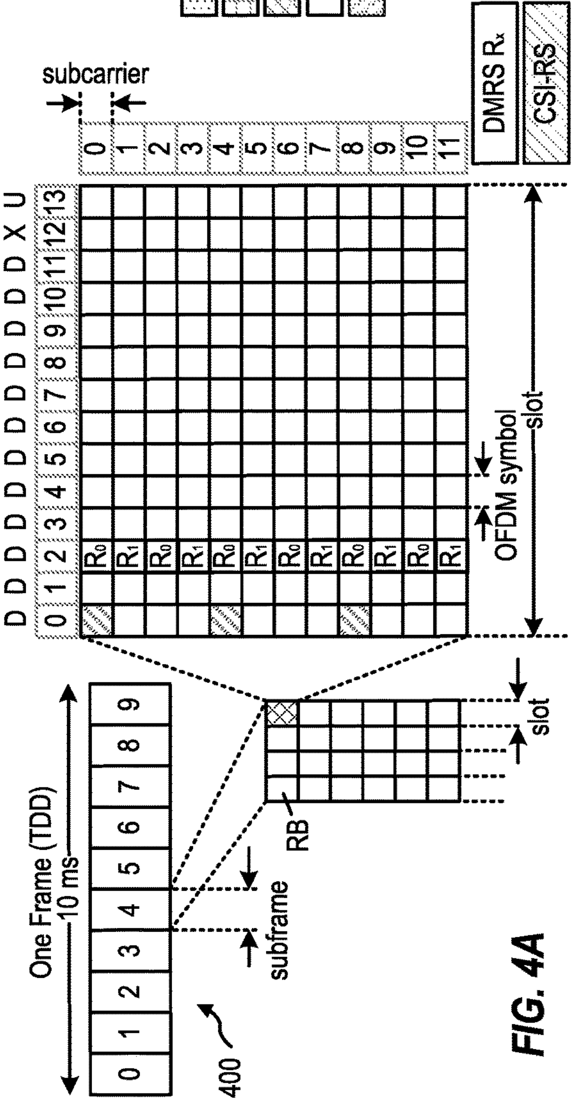
FIGS. 4A, FIG. 4B, FIG. 4C, and FIG. 4D depict various example aspects of data structures for a wireless communications network.
Figure 4B:
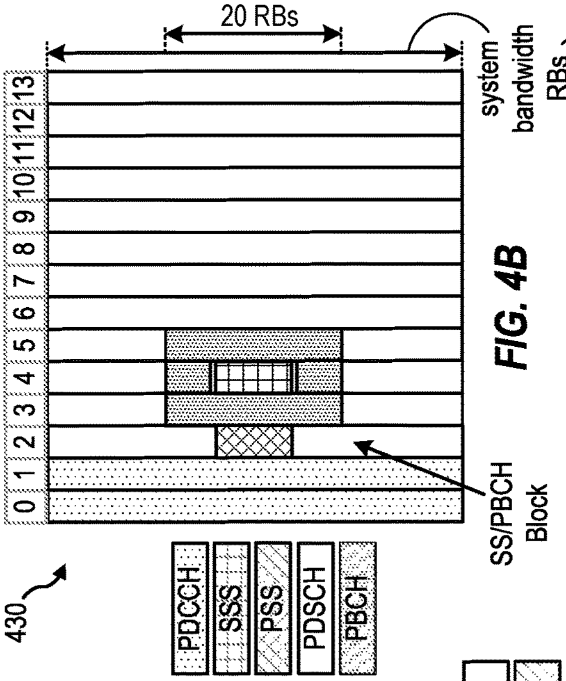
Figure 4C:
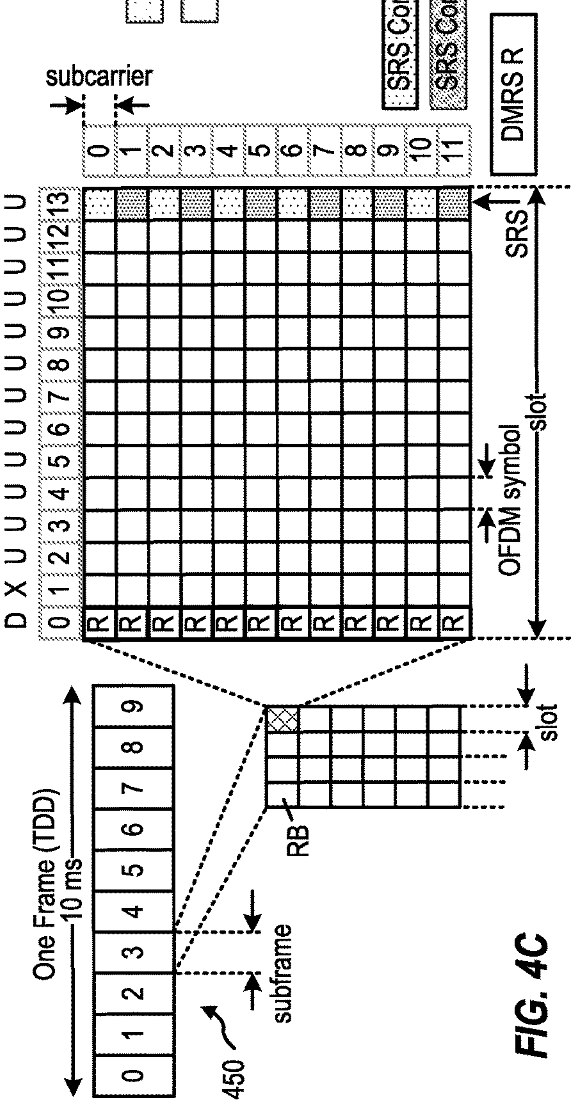
Figure 4D:
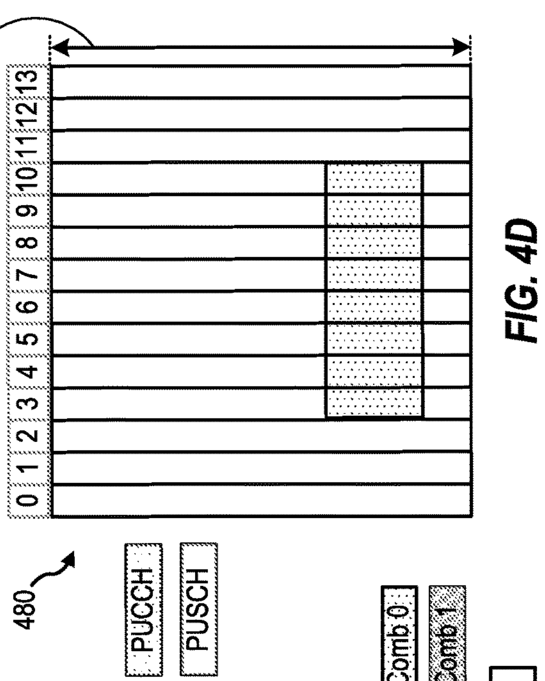

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to 24×15 kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mm Wave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mm Wave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Example Demodulation Reference Signals

DMRSs refers to demodulation reference signals. A DMRS is used by a new radio (NR) receiver to produce channel estimates for demodulation of associated physical channel. The design and mapping of the DMRS is specific to each of NR physical channels (e.g., physical downlink control channel (PDCCH), physical downlink shared channel (PDSCH), physical uplink shared channel (PUSCH), and physical uplink control channel (PUCCH)). The DMRS is user equipment (UE) specific which is transmitted on demand. The DMRS supports massive multi-user multiple-input multiple-output (MIMO). The DMRS can be beamformed and supports up to about 12 orthogonal layers. A DMRS sequence for cyclic prefix-orthogonal frequency division multiplexing (CP-OFDM) version is Quadrature Phase Shift Keying (QPSK) based on gold sequences. The QPSK is a form of phase shift keying in which two bits are modulated at once, selecting one of four possible carrier phase shifts (0, 90, 180, or 270 degrees).

As noted above, the DMRS may be used to estimate a radio channel. The signal is present only in resource blocks (RBs) allocated for a PDSCH. The DMRS structure is designed to support different deployment scenarios and use cases. A front-loaded design supports low-latency transmissions, twelve orthogonal antenna ports for MIMO transmissions, and up to four reference signal transmission instances in a slot to support high-speed scenarios. The front-loaded reference signals indicate that the signal occurs early in the transmission. The DMRS is present in each RB allocated for the PDSCH.

The parameters that control DMRS OFDM symbol locations are: PDSCH symbol allocation, mapping type, DMRS type A position, DMRS length, and DMRS additional position.

The symbol allocation of the PDSCH indicates the OFDM symbol locations used by the PDSCH transmission in a slot. DMRS symbol locations lie within the PDSCH symbol allocation. The positions of DMRS OFDM symbols depend on the mapping type. The mapping type of the PDSCH is either slot-wise (type A) or non-slot-wise (type B).

For mapping type A, the DMRS OFDM symbol locations are defined relative to the first OFDM symbol of the slot (symbol #0). The location of first DMRS OFDM symbol ($l_0$) is provided by the DMRS type A position, which is either 2 or 3. For any additional DMRS, the duration of OFDM symbols ($l_d$) is the number of OFDM symbols between the first OFDM symbol of the slot (symbol #0) and the last OFDM symbol of the allocated PDSCH resources. Note that $l_d$ may differ from the number of OFDM symbols allocated for PDSCH, when the first OFDM symbol of PDSCH is other than symbol #0.

For mapping type B, the DMRS OFDM symbol locations are defined relative to the first OFDM symbol of allocated PDSCH resources. The location of first DM-RS OFDM symbol ($l_0$) is always 0, meaning that the first DM-RS OFDM symbol location is the first OFDM symbol location of the allocated PDSCH resources. For any additional DM-RS, the duration of OFDM symbols ($l_d$) is the duration of the allocated PDSCH resources.

The parameters that control subcarrier locations of DMRS are DMRS configuration type and DMRS antenna port. The configuration type indicates a frequency density of DMRS and is signaled by radio resource control (RRC) message dmrs-Type. Configuration type 1 defines six subcarriers per physical resource block (PRB) per antenna port, including alternate subcarriers. Configuration type 2 defines four subcarriers per PRB per antenna port, consisting of two groups of two consecutive subcarriers.

Example Multiple-Input Multiple-Output (MIMO) Systems

Multiple-input multiple-output (MIMO) is a multi-antenna technology that exploits multipath signal propagation so that information-carrying capacity of a wireless link can be multiplied by using multiple antennas at a transmitter node and a receiver node to send multiple simultaneous streams. At a multi-antenna transmitter node, a precoding technique (e.g., scaling the respective streams' amplitude and phase) is applied (e.g., based on known channel state information (CSI)). At a multi-antenna receiver node, the different spatial signatures of the respective streams (e.g., known CSI) can enable the separation of these streams from one another.

For example, a network entity (e.g., a gNodeB (gNB)) may include multiple antennas supporting MIMO technology. The use of MIMO technology enables the network entity to exploit spatial domain to support spatial multiplexing, beamforming, and transmit diversity. The spatial multiplexing may be used to transmit different streams of data simultaneously on a same frequency. The data steams may be transmitted to a single user equipment (UE) to increase a data rate or to multiple UEs to increase overall system capacity. This is achieved by spatially precoding each data stream (i.e., applying a scaling of an amplitude and a phase) and then transmitting each spatially precoded stream through multiple transmit antennas on a downlink. The spatially precoded data streams arrive at the UEs with different spatial signatures, which enables each of the UEs to recover the one or more data streams destined for that UE. On uplink, each UE transmits a spatially precoded data stream, which enables the network entity to identify the source of each spatially precoded data stream.

The performance of a MIMO system is related to a received signal-to-interference-and-noise ratio (SINR) and correlation properties of a multipath channel and antenna configuration. Using precoding techniques, the MIMO system can increase and/or equalize the received SINR across the multiple receive antennas. The transmitter node can utilize a plurality of complex weighting precoding matrices to precode the streams of a MIMO channel. The precoding matrices can be defined in a codebook where each precoding matrix can be identified by a precoding matrix index (PMI). When the codebook is known to both the transmitter node and the receiver node, the receiver node can inform the transmitter node to use a certain precoding matrix by sending the PMI of the desired precoding matrix to the transmitter node.

In new radio (NR) uplink, a UE can support up to 32 transmit (Tx) antennas, while the gNB can support up to 1024 receive (Rx) antennas. So, fine beamforming can be implemented on both the UE-Tx end and the BS-Rx end. With the significant increase in a number of antennas, an uplink MIMO gain of NR is much greater, including beamforming gain and multiplexing gain. However, since the achievable gain also depends on the design of the transmission technology, a closed loop-MIMO may be a preferred choice in the transmission scheme for uplink data channels. When an open-loop MIMO is used in uplink transmissions, benefits of increasing the number of antennas are limited. A semi-open-loop MIMO may be used in scenarios where accurate CSI cannot be obtained, such as UE movement, rotation, and partial channel reciprocity. In some cases, the open loop MIMO may allow the UE to report a rank indicator (RI) and channel quality indicator (CQI), while the closed loop MIMO may allow the UE to report RI, CQI and PMI.

Example Beamforming, Precoding, and Precoder Cycling

Multiple antennas at a transmitter and a receiver can be used to achieve array and diversity gain instead of capacity gain. In this case, a same symbol weighted by a complex-valued scale factor is sent from each transmit antenna so that the input covariance matrix has a unit rank. This scheme is referred to as beamforming. There are two different classes of beamforming: (1) direction-of-arrival beamforming (i.e., adjustment of transmit or receive antenna directivity); and (2) Eigen-beamforming (i.e., a mathematical approach to maximize signal power at the receive antenna based on certain criterion).

An Eigen-beamforming scheme performs linear, single-layer, complex-valued weighting on the transmitted symbols, such that the same signal is transmitted from each transmit antenna using appropriate weighting factors. In this scheme, the objective is to maximize the signal power at the receiver output. When the receiver has multiple antennas, the single-layer beamforming cannot simultaneously maximize the signal power at every receive antenna, hence, precoding is used for multi-layer beamforming in order to maximize the throughput of a multi-antenna system. Precoding is a beamforming scheme to support multi-layer transmission in a multiple-input multiple-output (MIMO) system. Using precoding, multiple streams are transmitted from the transmit antennas with independent and appropriate weighting per antenna such that the throughput is maximized at the receiver output.

In a single-user MIMO system, identity matrix precoding (for open-loop) and singular value decomposition (SVD) precoding (for closed-loop) are used to achieve link-level MIMO channel capacity. In addition, random unitary precoding can achieve the open-loop MIMO channel capacity with no signaling overhead in the uplink. The SVD precoding, on the other hand, has been shown to achieve the MIMO channel capacity when channel state information (CSI) is signaled to the transmitter.

In a precoded MIMO system with $N_t$ transmit antennas and $N_r$ receive antennas, input-output relationship can be described as y=HWs+n where $s=[s_1, s_2, \ldots, s_M]^t$ is an M×1 vector of normalized complex-valued modulated symbols, $y=[y_1, y_2, \ldots, y_{Nr}]^t$ and $n=[n_1, n_2, \ldots, n_{Nr}]^t$ are the $N_r \times 1$ vectors of received signal and noise, respectively, H is the $N_r \times N_t$ complex-valued channel matrix, and W is the $N_t \times M$ linear precoding matrix. The superscript "t" denotes the transpose operator.

In the receiver, a hard decoded symbol vector is obtained by decoding the received vector y by a vector decoder, assuming knowledge of the channel and the precoding matrices. The entries of H are independent and distributed according to Z(0,1) and the entries of noise vector n are independent and distributed according to Z(0,N0). The input vector s is assumed to be normalized, thus $E[ss^H]=I$ where I is an identity matrix. The receiver selects a precoding matrix $W_i$, i=1, 2, . . . , $N_{codebook}$ from a finite set of quantized precoding matrices, and sends the index of the chosen precoding matrix back to the transmitter over a low-delay feedback channel.

In some cases, new radio (NR) may support a spatial multiplexing mode with channel-independent (open-loop) precoding in the form of precoder cycling. For example, a transmitter cycles through four precoders Wi-$W_4$ to precode different sets of four baseband symbol vectors to be transmitted, e.g., $s_r s_4$, $s_5$-$s_8$, etc. The precoders, $W_1$-$W_4$, map the symbol vectors, s(-$s_4$, $s_5$-$s_8$) etc. to precoded baseband symbol vectors, XI-$X_{4>}$Xs-xβ, etc. through a matrix-vector multiplication operation, e.g., Xi=WISI. The elements of a precoded baseband symbol have a one-to-one correspondence to the transmit antenna ports. Each precoded baseband symbol vector is thereafter transmitted over one of the effective MIMO channels, Hp$H_4$, $H_5$-$H_8$, etc. An effective MIMO channel models the physical radio communications channel along with the physical antennas, radio hardware, and baseband signal processing used to communicate over that channel.

In some cases, cycling is achieved by precoding one symbol Si with precoder matrix W 1, symbol $s_2$ with precoder matrix $W_2$, symbol $s_3$ with precoder matrix $W_3$, and symbol $s_4$ with precoder matrix $W_4$, and then using Wi-$W_4$ to precede the next four symbols and so forth. The receiver receives parallel signals $y_r y_4$, $V_5$-$V_8$, etc., and filters them in respective filters fi-$f_4$, $f_5$-$f_8$, etc. modeled based on the four precoders $W_r W_4$ to produce estimates $s_r s_4$, $s_5$-$s_8$, etc. of the symbols $s_r s_4$, $s_5$-$s_8$, etc. originally transmitted. Alternatively, the receiver detects the bit-streams represented by the symbols SI-$s_4$, $s_5$-$s_8$, etc. directly from the received parallel signals yp$y_4$, $y_5$-$y_8$, etc. using maximum-likelihood decoding (or some other decoder metric).

Overview of Channel State Information (CSI)

Channel state information (CSI) indicates channel properties of a communication link. The CSI represents combined effects of, for example, scattering, fading, and power decay with distance between a transmitter device and a receiver device. Channel estimation using pilots, such as CSI reference signals (CSI-RS), may be performed to determine these effects on a channel. The CSI may be used to adapt transmissions based on current channel conditions, which is useful for achieving reliable communication, in particular, with high data rates in multi-antenna systems. The CSI is measured at the receiver device, quantized, and fed back to the transmitter device.

Time and frequency resources that can be used by a user equipment (UE) to report the CSI are controlled by a base station (BS) (e.g., gNB). The CSI may include channel quality indicator (CQI), precoding matrix indicator (PMI), CSI-RS resource indicator (CRI), SS/PBCH Block Resource indicator (SSBRI), layer indicator (LI), rank indicator (RI) and/or L1 reference signal received power (RSRP). However, as described below, additional or other information may be included in a CSI report.

A UE may be configured by a BS for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI).

The UE may report the CSI feedback (CSF) based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSF for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink (DL) bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $$N_{PRB}^{SB}$$

contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Overview of Channel State Information (CSI) Feedback Coefficient Reporting

As noted above, a user equipment (UE) may be configured for channel state information (CSI) reporting, for example, by receiving a CSI configuration message from a base station (BS). In some cases, the UE may be configured to report at least a Type II precoder across configured frequency division (FD) units. For example, a precoder matrix $W_r$ for layer r includes $W_1$ matrix, reporting a subest of selected beams using spatial compression and $W_{2,r}$ matrix, reporting (for cross-polarization) linear combination coefficients for the selected beams (2L) across the configured FD units:

$$W_r = \sum_{i=0}^{2L-1} b_i \cdot c_i, \text{ where } c_i = \underbrace{[c_{i,0} \ \dots \ c_{i,N_3-1}]}_{N_3},$$

where $b_i$ is the selected beam, $c_i$ is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is radio resource control (RRC) configured. The precoder is based on a linear combination of digital Fourier transform (DFT) beams. The Type II codebook may improve multi-user (MU) multiple input multiple output (MIMO) performance. In some configurations considering there are two polarizations, the $W_{2,r}$ matrix has size $2L \times N_3$.

Figure 5:
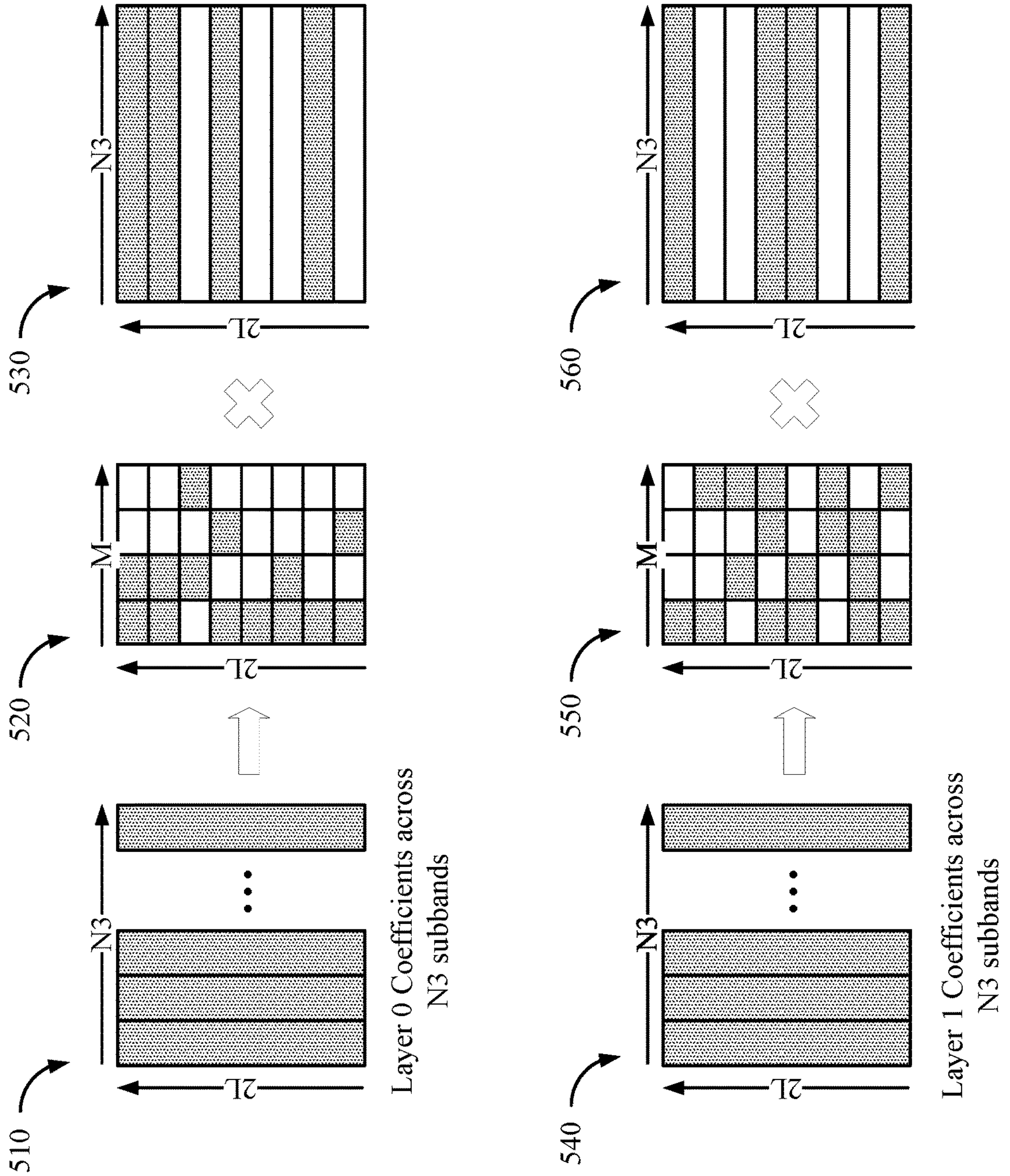
FIG. 5 depicts example precoding (or precoder) matrices.

In some cases, the UE may be configured to report FD compressed precoder feedback to reduce overhead of the CSI report. As depicted in FIG. 5, the precoder matrix ($W_{2,i}$) for layer i with i=0.1 may use an FD compression $$W_{f,i}^H$$

to compress the precoder matrix into $\tilde{W}_{2,i}$ matrix size to $2L \times M$ (where M is network configured and communicated in the CSI configuration message via RRC or downlink control information (DCI), and $M<N_3$) given as:

$$W_i = W_1 \tilde{W}_{2,i} W_{f,i}^H$$

Where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network entity configured via an RRC), and one entry therein represents the coefficient of one tap for this spatial beam. The UE may be configured to report (e.g., CSI report) a subset $K_0<2$ LM of the linear combination coefficients of the $\tilde{W}_{2,0}$ matrix 520. For example, the UE may report $K_{NZ,i}<K_0$ coefficients (where $KN_{z,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of $$W_{f,0}^H$$

matrix 530. In the example shown, both the $\tilde{W}_{2,0}$ matrix 520 at layer 0 and the $\tilde{W}_{2,0}$ matrix 550 at layer 1 are $2L \times M$.

The $$W_{f,0}^H$$

matrix 530 is composed of the basis vectors (each row is a basis vector) used to perform compression in frequency domain. In the example shown, both the $$W_{f,0}^H$$

matrix 530 at layer 0 and the $$W_{f,1}^H$$

matrix 560 at layer 1 include M=4 FD basis (illustrated as shaded rows) from $N_3$ candidate DFT basis. In some configurations, the UE may report a subset of selected basis of the $$W_{f,i}^H$$

matrix via CSI report. The M bases specifically selected at layer 0 and layer 1. That is, the M bases selected at layer 0 can be same/partially-overlapped/non-overlapped with the M bases selected at layer 1.

Overview of Precoding Matrix Indicator (PMI) Codebook-Based Channel State Feedback (CSF)

A precoding matrix indicator (PMI) codebook refers to a dictionary of PMI entries. In this way, using a PMI codebook, each PMI component from a pre-defined set can be mapped to bit-sequences reported by a user equipment (UE). A network entity receiving a bit-sequence (e.g., as channel state feedback (CSF)) can then obtain a corresponding PMI from the reported bit-sequence.

How the UE calculates PMI may be left to the UE implementation. However, how the UE reports the PMI should follow a format defined in the codebook, so the UE and the network entity each know how to map PMI components to reported bit-sequences.

Figure 6:
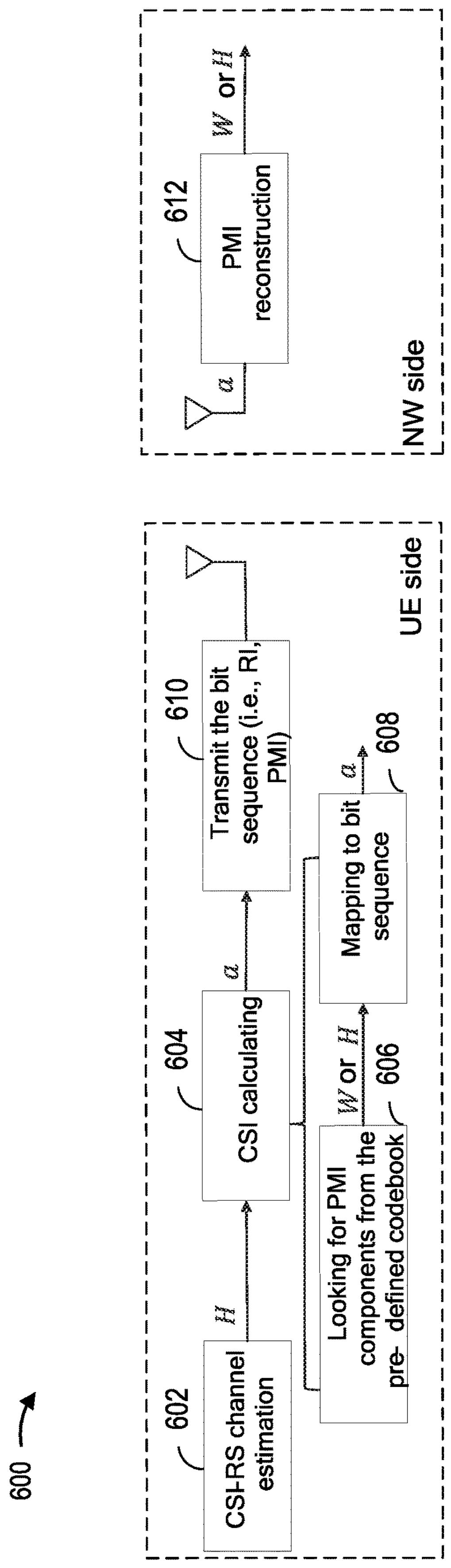
FIG. 6 depicts example codebook (CB) based channel state feedback (CSF).

FIG. 6 depicts example codebook-based CSF 600. As depicted, a UE may first perform channel estimation (at 602) based on channel state information (CSI) reference signal (RS) to estimate channel H. A CSI calculating block 604 may generate a bit sequence a. As illustrated, bit sequence a may be generated looking for PMI components from the pre-defined PMI codebook for radio channel H or precoder W (at block 606) and mapping the PMI components to the bit sequence a, via block 608. This mapping, from a set of predefined PMI components acts as a form of quantization. The UE transmits the bit sequence a to the BS (e.g., in a CSI report), via block 610.

As depicted in FIG. 6, at the network entity side, the network entity receives the bit sequence a reported by the UE. The network entity then follows the codebook to obtain each PMI component using the reported bit-sequence a and reconstructs the actual PMI, at block 612, using each PMI component (obtained from the codebook), to recover the radio channel H or precoder W.

In new radio (NR) systems, to transmit and received data in downlink and uplink, UEs need bandwidth resource allocated and this allocation is provided by a gNB. The resource allocation is done in a time domain and a frequency domain. Time domain resource allocation defines which symbols are allocated to a UE and frequency domain allocation defines which resource blocks (RBs) are allocated to the UE. A resource block group (RBG) defines a set of RBs and each RBG is denoted by a single bit. A resource element (RE) may be a smallest unit of a resource grid made up of one subcarrier in frequency domain and one symbol in time domain. In some cases, for allocation of UE frequency resources, a minimum number of RBs that can be allocated may be equal to 24 and a maximum number of RBs that can be allocated may be equal to 275.

Some radio resources are assigned in units of physical resource blocks (PRBs), where one PRB includes 12 subcarriers and one slot. In some cases, the PRBs may be bundled, with a common precoder matrix used across all RBs in a bundle. As a result, PRB bundling may enable a UE to estimate a precoded channel jointly across the RBs and improve channel estimation (CE) performance. For high speed UEs, open loop schemes may be used, in which a precoder cycling is employed where several different (e.g., randomly selected) precoders are used for the data allocated to the UE. This precoder cycling may be utilized in an effort to sweep many different directions to make the precoded channel appear ergodic. A table showing different number of physical resource block groups (PRGs) for different PRB bundling sizes is illustrated in a table 700 of FIG. 7.

Figure 8:
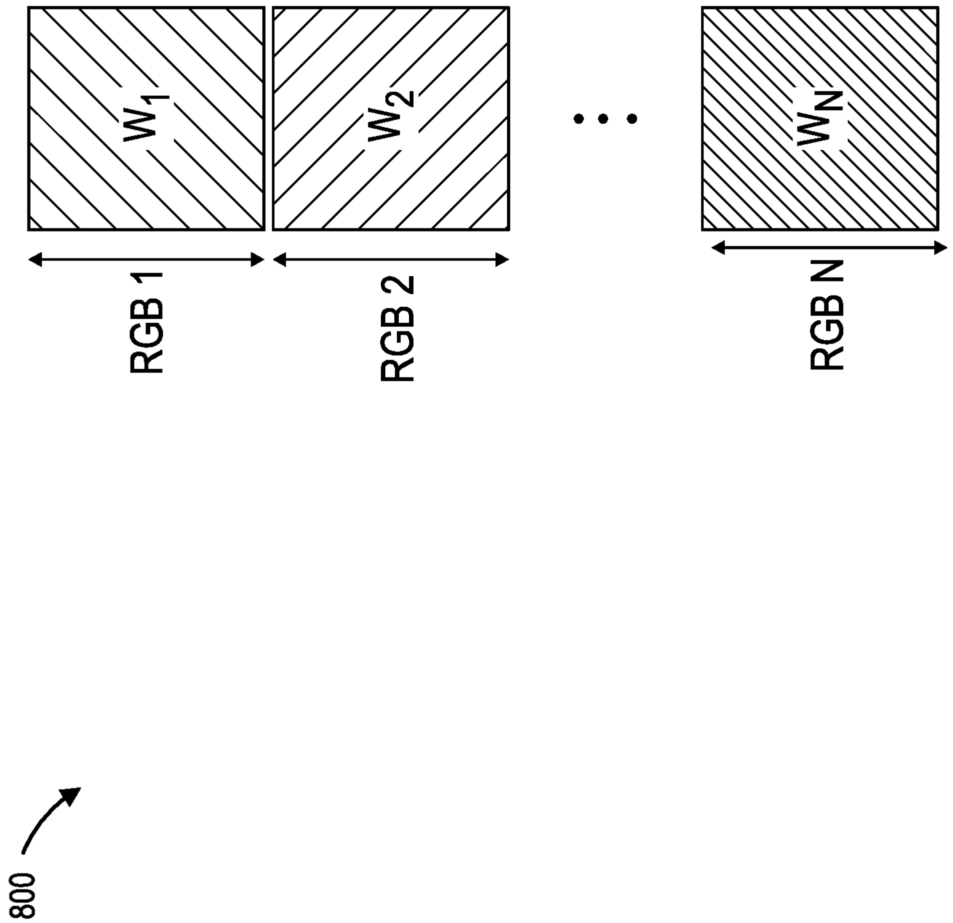
FIG. 8 depicts example resource block group (RBG)-level precoder cycling.

In some cases, an RBG-level precoder cycling may be implemented (e.g., for an open-loop multiple-input multiple-output (MIMO)). An RBG generally defines a set of RBs of a given size. For example, as illustrated in a diagram 800 of FIG. 8, a precoder cycling may be achieved by precoding a first RBG with a first precoder $W_1$, a second RBG with a second precoder $W_2$, Nth RBG with Nth precoder $W_N$, and then using these N number of precoders for next N number of RGBs and so forth.

There are several potential challenges associated with the RBG-level precoder cycling. For instance, to achieve a full precoder cycling based on the RBG-level precoder cycling, a large number of RBGs may be required, which may not be desirable. For example, a number of beams per polarization may be equal to four (e.g., {120° coverage with 30° half power beam width (HPBW)}, {60° coverage with 15° HPBW}, {30° coverage with 7.5° HPBW}). Also, cross-polarization co-phasing may be equal to four, and sixteen RBGs may be required for one precoder cycling. So, a large bundling size may require a huge amount of RBs for the precoder cycling, while a small bundling size may degrade the CE performance. That is, there is a tradeoff between a diversity gain and the CE performance.

In NR, a semi-open loop MIMO may be supported, where a precoder cycling may be applied with a partial CSI. In such systems, a CSI report quantity may be set to CSI reference signal resource indicator (CRI)-rank indicator (RI)-il' or 'CRI-RI-channel quality indicator (CQI)' or 'CRI-RI-il-CQI'. For mode-1 PMI, il indicates a best beam vector, and cross polarization (XPOL) co-phasing parameters can be cycled. For mode-2 PMI, il indicates a best beam group including four beams, and beam and co-phasing parameters can be cycled. In some cases, a report quantity may be set to 'CRI-reference signal receive power (RSRP).' In this case, CSI reference signal resources are precoded with sampled beams. Also based on 'CRI-RSRP', the gNB may decide a group of precoding matrices and applies cycling within the group of precoding matrices. In such systems, there may be a requirement for a large number of RBs to be allocated to a UE for cycling. For mode 1, at least 4 RBGs may be needed for one cycling. For mode 2, at least 16 RBGs are needed for one cycling.

Aspects Related To High-Resolution Precoder Cycling

As noted above, in some systems, closed loop multiple-input multiple-output (MIMO) may incur significant signaling overhead for feedback (e.g., for subband channel state information (CSI)). Additionally, in such systems, there may be significant latency in providing the feedback, which may cause communication performance degradation. This latency may be particular impactful in cases of fast moving UEs, since some subband CSI parameters may be more sensitive to a UE speed.

In some cases, open-loop MIMO or semi-open loop MIMO may be a solution to reduce the feedback overhead and latency, which may help support fast moving UEs. However, as noted above, coarse granularity, such as resource block group (RBG)-level transparent precoder cycling for open-loop MIMO, may still require a relatively large number of resource blocks (RBs) to be allocated to a UE, which is not desirable. Alternatively, simply using a small RB bundling size may degrade a channel estimation (CE) performance.

Aspects of the present disclosure provide apparatuses, methods, processing systems, and computer-readable mediums for managing precoder cycling for open-loop and semi-open loop MIMO systems. For example, aspects of the present disclosure described herein provides open-loop/semi-open loop MIMO schemes with a finer granularity (e.g., at resource element (RE)/RB-level) non-transparent precoder cycling, while keeping a same (DMRS) bundling size. For example, a non-transparent RE/RB-level type one precoder cycling may be implemented where two different polarizations are applied to a same precoding vector and cross polarization (XPOL) co-phasing values that are cycled at the RE/RB-level. Furthermore, each DMRS port may be associated with at least one precoding vector and at least one polarization.

Particular aspects of the subject matter described in this disclosure can be implemented to realize one or more of the following potential advantages. In some examples, the described techniques may support: a high-resolution (e.g., RE/RB-level) precoder cycling which may increase transmit diversity, DMRS bundling size that may be kept as RBG-level and this may increase the CE performance, and additional RBG-level precoder cycling in a transparent manner.

Figure 9:
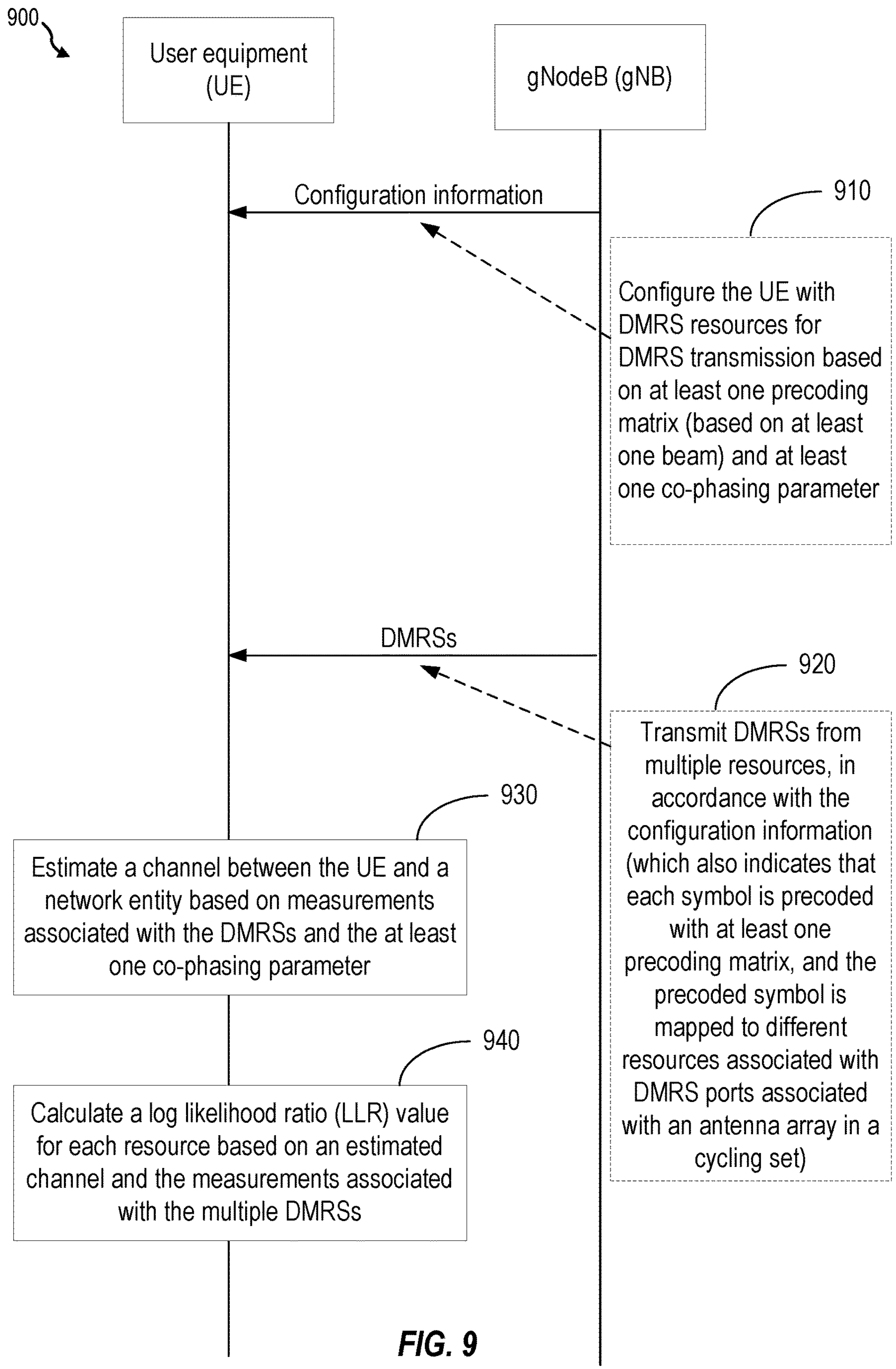
FIG. 9 depicts a call flow diagram illustrating example communication between a UE and a network entity, in accordance with aspects of the present disclosure.

FIG. 9 depicts a call flow diagram 900 illustrating example communication among a UE and a network entity (e.g., a gNodeB (gNB)) for managing precoder cycling for MIMO systems. The UE shown in FIG. 9 may be an example of the UE 104 depicted and described with respect to FIG. 1 and FIG. 3. The gNB depicted in FIG. 9 may be an example of the BS 102 depicted and described with respect to FIG. 1 and FIG. 3, or the disaggregated BS depicted and described with respect to FIG. 2.

As indicated at 910, the gNB transmits configuration information to the UE. The configuration information may indicate that each symbol is precoded with at least one precoding matrix.

In certain aspects, the at least one precoding matrix may be based on at least one beam and at least one co-phasing parameter associated with the at least one beam.

In certain aspects, the precoded symbol may be mapped to different resources associated with DMRS ports associated with an antenna array in a cycling set (or manner).

In certain aspects, the gNB may also transmit a configuration of a quantity of beams to the UE. For example, the UE may be configured with a number of (candidate) beams by the gNB. In certain aspects, a quantity of DMRS ports may be based on at least the quantity of beams.

As indicated at 920, the gNB transmits DMRSs to the UE. For example, the gNB may transmit the DMRSs from multiple resources, in accordance with the configuration information. In one example, each resource may correspond to a RE. In another example, each resource may correspond to a RB.

As indicated at 930, the UE estimates a channel between the UE and the gNB based on measurements associated with the multiple DMRSs and the at least one co-phasing parameter.

As indicated at 940, the UE calculates a log likelihood ratio (LLR) value for each resource based on an estimated channel and the measurements associated with the multiple DMRSs.

In certain aspects, a type 1 based RE/RB-level precoder cycling for rank 1 may be implemented. For example, a precoder cycling may be performed based on rank-1 type 1 precoding matrix. In such cases, a received signal (y) (e.g., when rank-1 type 1 precoding matrix is applied) by a UE may be represented as:

$$y = HWs + n = [H_+ H_-]\begin{bmatrix} x \\ \varphi x \end{bmatrix} s + n = (H_+ x + \varphi H_- x)s + n$$

where at least $$\begin{bmatrix} x \\ \varphi x \end{bmatrix}$$

may represent a precoding matrix in which φ may represent a co-phasing parameter and x may represent a (candidate) beam, H may be $N_r \times N_t$ complex-valued channel matrix, W may be the $N_t \times M$ linear precoding matrix, superscript "t" may denote a transpose operator, $N_t$ may represent transmit antennas, $N_r$ may represent receive antennas, $S=[s_1, s_2, \ldots, s_M]^t$ is an M×1 vector of normalized complex-valued modulated symbols, $n=[n_1, n_2, \ldots, n_{N_r}]^t$ are the $N_r \times 1$ vectors of received signal and noise, respectively. Also, in this example case, a number of DMRS ports used may be equal to a number of (candidate beams) multiplied by two. $H_+$ and $H_-$ represent complex-valued channel matrices for + polarization and − polarization, respectively. Also, each DMRS port may be associated with one precoding matrix and one polarization. For example, each DMRS port is precoded with x on each polarization.

In such cases at the gNB, each data symbol (or RE/RB) may be precoded with one precoding matrix $$\begin{bmatrix} x \\ \varphi x \end{bmatrix}.$$

The precoded data symbol may be mapped to each resource in a cycling manner. For each data resource, the UE may calculate the LLR after determining (or obtaining) an estimated channel ($DMRS_+ + \varphi DMRS_-$) using DMRS channel estimates for XPOL applying a same beam. DMRS+ may correspond to DMRS channel estimates for a first polarization and DMRS. may correspond to DMRS channel estimates for a second polarization.

Figure 10:
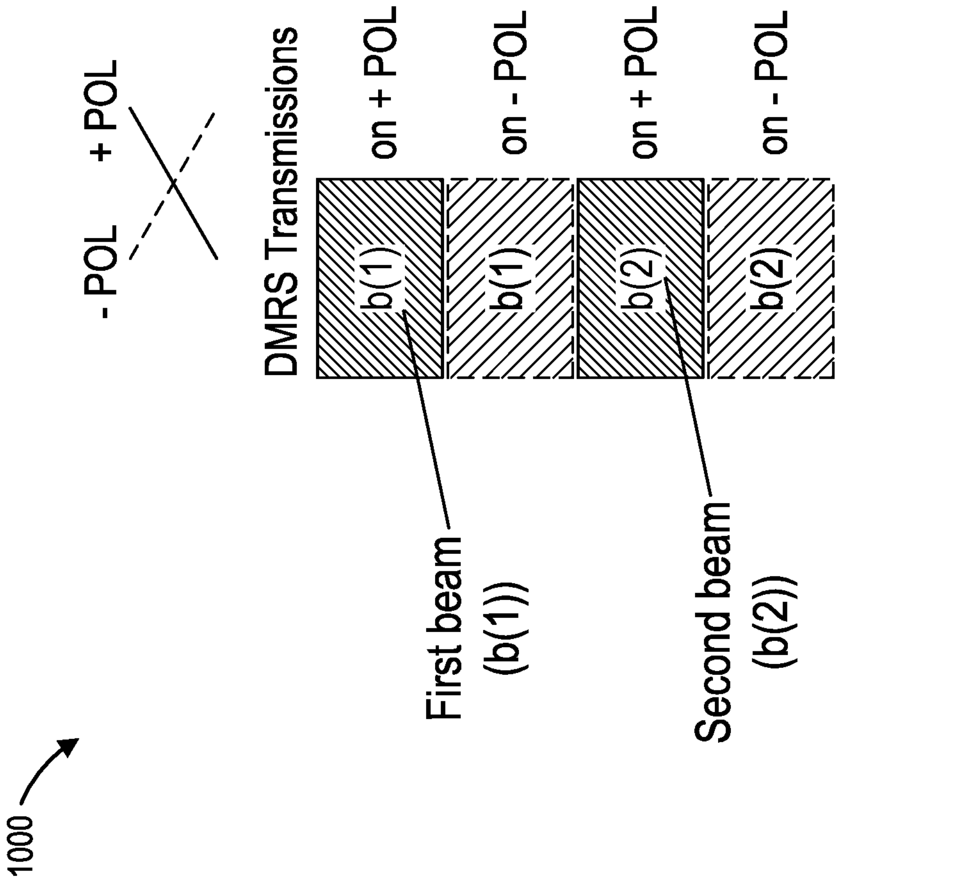
FIG. 10 depicts example demodulation reference signal (DMRS) transmissions via different beams on different polarizations.
Figure 11:
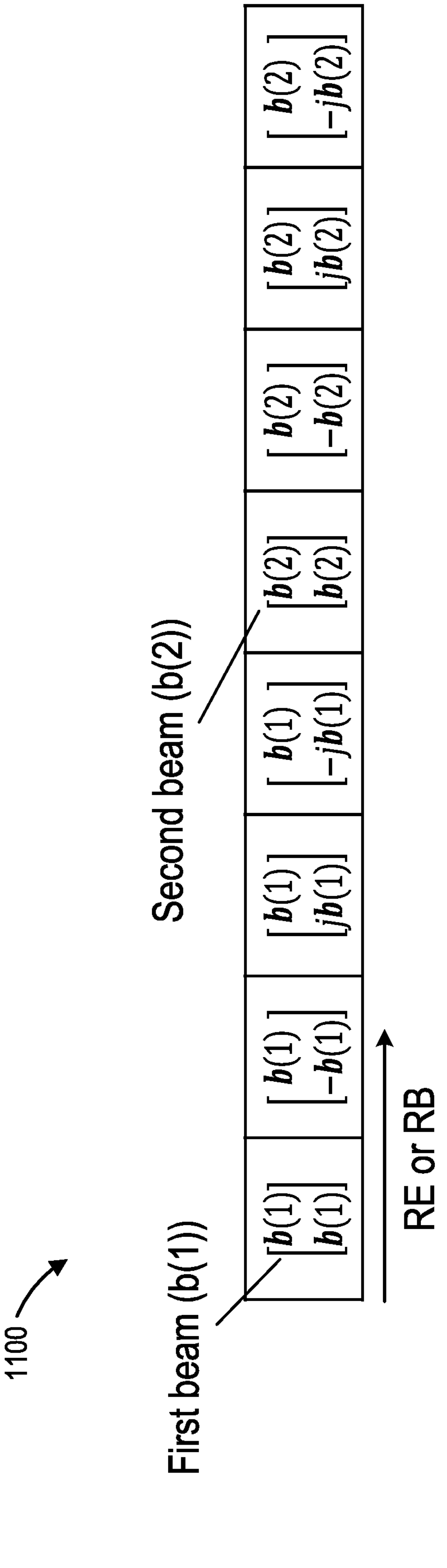
FIG. 11 depicts example physical downlink shared channel (PDSCH) resource mapping to a precoding matrix.

In some cases, two (candidate) beams with XPOL and Quadrature Phase Shift Keying (QPSK) co-phasing may be configured. In such cases, there may be four DMRS ports (which is equal to a number of beams×2). For example, as illustrated in a diagram 1000 of FIG. 10, a first beam is transmitted via a first DMRS port on a positive polarization (e.g., DMRS Port-1: Beam-1 on + polarization). The first beam is also transmitted via a second DMRS port on a negative polarization (e.g., DMRS Port-2: Beam-1 on − polarization). A second beam is transmitted via a third DMRS port on a positive polarization (e., DMRS Port-3: Beam-2 on + polarization). The second candidate beam is also transmitted via a fourth DMRS port on a negative polarization (e.g., DMRS Port-4: Beam-2 on − polarization). In such cases, eight resources (e.g., consecutive eight resources) may apply a precoder cycling using the precoding matrix $$\begin{bmatrix} x \\ \varphi x \end{bmatrix}$$

as illustrated in a diagram 1100 of FIG. 11, where precoding vector x for the first beam and the second beam, and φ∈{1, −1, j, −j}, i.e., (b1+φ=1)→(b1+φ=−1)→(b1+φ=j)→(b1+φ=−j)→(b2+φ=1)→(b2+φ=−1)→(b2+φ=j)→(b2+φ=−j)→(b1+φ=1), where (bi+4=a) may describe the case where the precoding vector x is placed with i-th beam and co-phasing value applies a value.

In certain aspects, a type 1 based RE/RB-level precoder cycling for rank more than 1 may be implemented. For example, a precoder cycling may be performed based on rank>1 type 1 precoding matrix. In such cases, a received signal (y) (e.g., when rank>1 (or rank R) type 1 precoding matrix (MxR) (which can be written as $$W(\varphi) = \begin{bmatrix} X_+ \\ \varphi X_- \end{bmatrix})$$

is applied) by a UE may be represented as:

$$y = HW(\varphi)s + n = (H_+ X_+ + \varphi H_- X_-)s + n$$

where R represents a transmission rank, M represents a number of antennas/ports, φ represents a co-phasing parameter, and $X_+$ and $X_-$ represent (candidate) precoding matrices for + polarization and − polarization, respectively.

In such cases, a number of DMRS ports may be equal to a number of (candidate) precoding matrices ($X_+$ and $X_-$) multiplied by a rank number (R) multiplied by two. Examples of (candidate) precoding matrices (X, and $X_-$) for different ranks are illustrated in a diagram 1200 of FIG. 12.

In certain aspects, a gNB may configure the number of (candidate) precoding matrices via radio resource control (RRC) configuration. In certain aspects, the gNB may dynamically indicate the rank to the UE via downlink control information (DCI).

In some aspects, a first R DMRS ports (e.g., when rank is equal to two, then first two DMRS ports) may be precoded with a candidate precoding matrix X, on a positive polarization. A second R DMRS ports (e.g., when rank is equal to two, then second two DMRS ports, after the first two DMRS ports) may be precoded with a candidate precoding matrix $X_-$ on a negative polarization. For every subsequent 2R DMRS ports, different candidate precoding matrices are applied as precoded in the above-noted cases.

In such cases, at the gNB, each R-tuple data symbol vector may be precoded with a precoding matrix in $$\begin{bmatrix} X_+ \\ \varphi X_- \end{bmatrix}$$

which $X_+$ and $X_-$ are candidate precoding matrices for the positive polarization and the negative polarization, respectively. Also, a precoded data symbol vector may be mapped to each resource in a cycling manner. For each data resource, the UE may calculate the LLR after determining an estimated channel matrix ($DMRS_+ + \varphi DMRS_-$) using 2R port DMRS channel estimates for XPOL associated to a same precoding matrix W(φ).

In certain aspects, the RE/RB-level precoder cycling may be applicable for multi-panel antenna array structures.

In certain aspects, the antenna array includes multiple antenna sub-arrays. For example, the antenna array may be divided into multiple sub-arrays (panels). In such cases, each antenna sub-array may be precoded with the at least one precoding matrix and mapped to one or more DMRS ports. For example, each sub-array may be precoded by a given precoding matrix $X_n$ and mapped to n-th R DMRS ports.

In certain aspects, the configuration information may indicate that one or more co-phasing parameters are cycled with a phase value across the multiple antenna sub-arrays. For example, across the sub-arrays, the co-phasing parameters may be cycled with a phase value ($e^{j\phi_n(l)}$).

In certain aspects, a precoding matrix $X_n$ may apply the precoder cycling, and in such cases, a received signal (y) by the UE can be represented as:

$$y(l) = [H_1(l) \ \dots \ H_N(l)] \begin{bmatrix} X_1 \\ \vdots \\ e^{j\phi_N(l)} X_N \end{bmatrix} s + n = \left( \sum_{n=1}^{N} e^{j\phi_n(l)} H_n(l) X_n \right) s + n$$

where at least $$\begin{bmatrix} X_1 \\ \vdots \\ e^{j\phi_N(l)} X_N \end{bmatrix}$$

represents a precoding matrix with φ as a co-phasing parameter and N as a number of multiple antenna sub-arrays.

In such cases, a quantity of DMRS ports may be based on at least the number of precoding matrices, the transmission rank number, and the number of the multiple antenna sub-arrays. For example, the number of DMRS ports may be equal to the number of (candidate) precoding matrices multiplied by the rank number multiplied by the number of multiple antenna sub-arrays, where each R number of DMRS ports are precoded with $X_n$ on each array group.

In certain aspects, the UE may receive the DCI from the gNB indicating the transmission rank number. For example, the transmission rank number may be dynamically indicated via the DCI.

In certain aspects, the UE may receive RRC signaling indicating a quantity of precoding matrices and a quantity of the multiple antenna sub-arrays. For example, the number of precoding matrices and the number of sub-arrays may be configured via the RRC.

In certain aspects, each R tuple data symbol vector may be precoded with the precoding matrix and mapped to each resource in a cycling manner. In certain aspects, the UE may demodulate data after calculating a precoded channel ($DMRs_1 + \dots + \varphi_N DMRS_N$) using DMRS channel estimates for N number of sub-arrays.

Example Method for Wireless Communications at a User Equipment (UE)

FIG. 13 shows an example of a method 1300 for wireless communications at a user equipment (UE), such as the UE 104 of FIG. 1 and FIG. 3.

Method 1300 begins at step 1310 with receiving configuration information indicating that each symbol is precoded with at least one precoding matrix. The at least one precoding matrix is based on at least one beam and at least one co-phasing parameter associated with the at least one beam. The precoded symbol is mapped to different resources associated with demodulation reference signal (DMRS) ports associated with an antenna array in a cycling set. In some cases, the operations of this step refer to, or may be performed by, circuitry for receiving and/or code for receiving as described with reference to FIG. 15.

Method 1300 then proceeds to step 1320 with receiving multiple DMRSs from multiple resources, in accordance with the configuration information. In some cases, the operations of this step refer to, or may be performed by, circuitry for receiving and/or code for receiving as described with reference to FIG. 15.

In certain aspects, the method 1300 further includes estimating a channel between the UE and a network entity based on measurements associated with the multiple DMRSs and the at least one co-phasing parameter.

In certain aspects, the method 1300 further includes calculating a log likelihood ratio (LLR) value for each resource based on an estimated channel and the measurements associated with the multiple DMRSs.

In certain aspects, each resource corresponds to a resource element (RE) or a resource block (RB).

In certain aspects, the method 1300 further includes receiving a configuration of a quantity of beams.

In certain aspects, a quantity of DMRS ports is based on at least the quantity of beams.

In certain aspects, each DMRS port is associated with one precoding matrix and one polarization.

In certain aspects, a transmission rank number is equal to one and the at least one precoding matrix comprises a single precoding matrix.

In certain aspects, a transmission rank number is more than one, and wherein a quantity of DMRS ports is based on at least a quantity of precoding matrices and the transmission rank number.

In certain aspects, the method 1300 further includes receiving downlink control information (DCI) indicating the transmission rank number.

In certain aspects, the method 1300 further includes receiving radio resource control (RRC) signaling indicating the quantity of precoding matrices.

In certain aspects, a first subset of the quantity of DMRS ports are precoded with a first precoding matrix of the quantity of precoding matrices on a first polarization type, and wherein a number of the first subset of the quantity of DMRS ports is equal to the transmission rank number.

In certain aspects, a second subset of the quantity of DMRS ports are precoded with a second precoding matrix of the quantity of precoding matrices on a second polarization type, and wherein a number of the second subset of the quantity of DMRS ports is equal to the transmission rank number.

In certain aspects, the at least one precoding matrix is further based on candidate precoding matrices for a first polarization type and a second polarization type.

In certain aspects, the candidate precoding matrices are different for different transmission rank numbers.

In certain aspects, the antenna array comprises multiple antenna sub-arrays.

In certain aspects, each antenna sub-array is precoded with the at least one precoding matrix and mapped to one or more DMRS ports.

In certain aspects, the configuration information indicates that one or more co-phasing parameters are cycled with a phase value across the multiple antenna sub-arrays.

In certain aspects, a quantity of DMRS ports is based on at least a quantity of precoding matrices, a transmission rank number, and a quantity of the multiple antenna sub-arrays.

In certain aspects, the method 1300 further includes receiving DCI indicating the transmission rank number.

In certain aspects, the method 1300 further includes receiving RRC signaling indicating the quantity of precoding matrices and the quantity of the multiple antenna sub-arrays.

Figure 15:
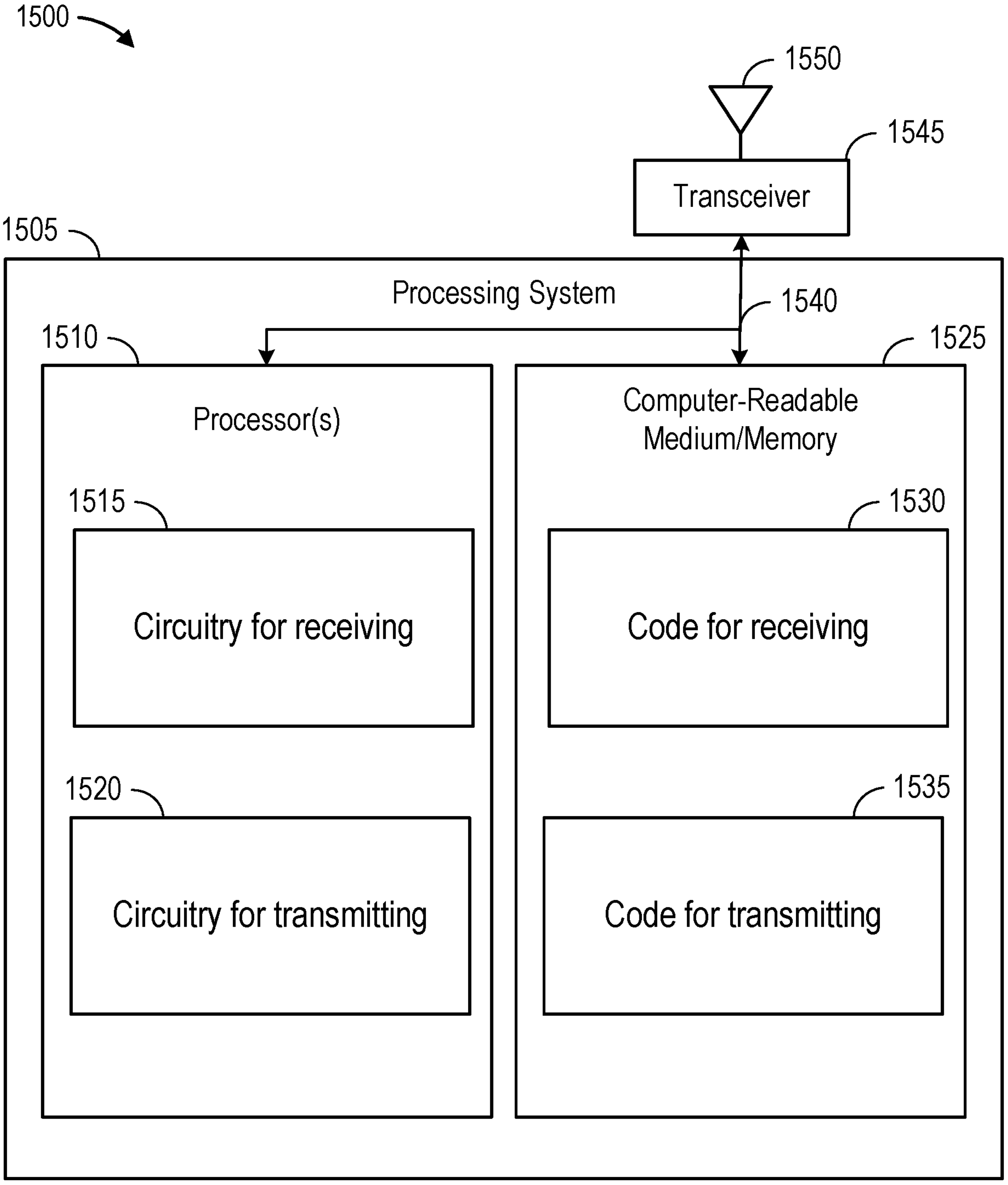
FIG. 15 and FIG. 16 depict example communications devices.

In one aspect, the method 1300, or any aspect related to it, may be performed by an apparatus, such as a communications device 1500 of FIG. 15, which includes various components operable, configured, or adapted to perform the method 1300. The communications device 1500 is described below in further detail.

Note that FIG. 13 is just one example of a method, and other methods including fewer, additional, or alternative steps are possible consistent with this disclosure.

Example Method for Wireless Communications at a Network Entity

Figure 14:
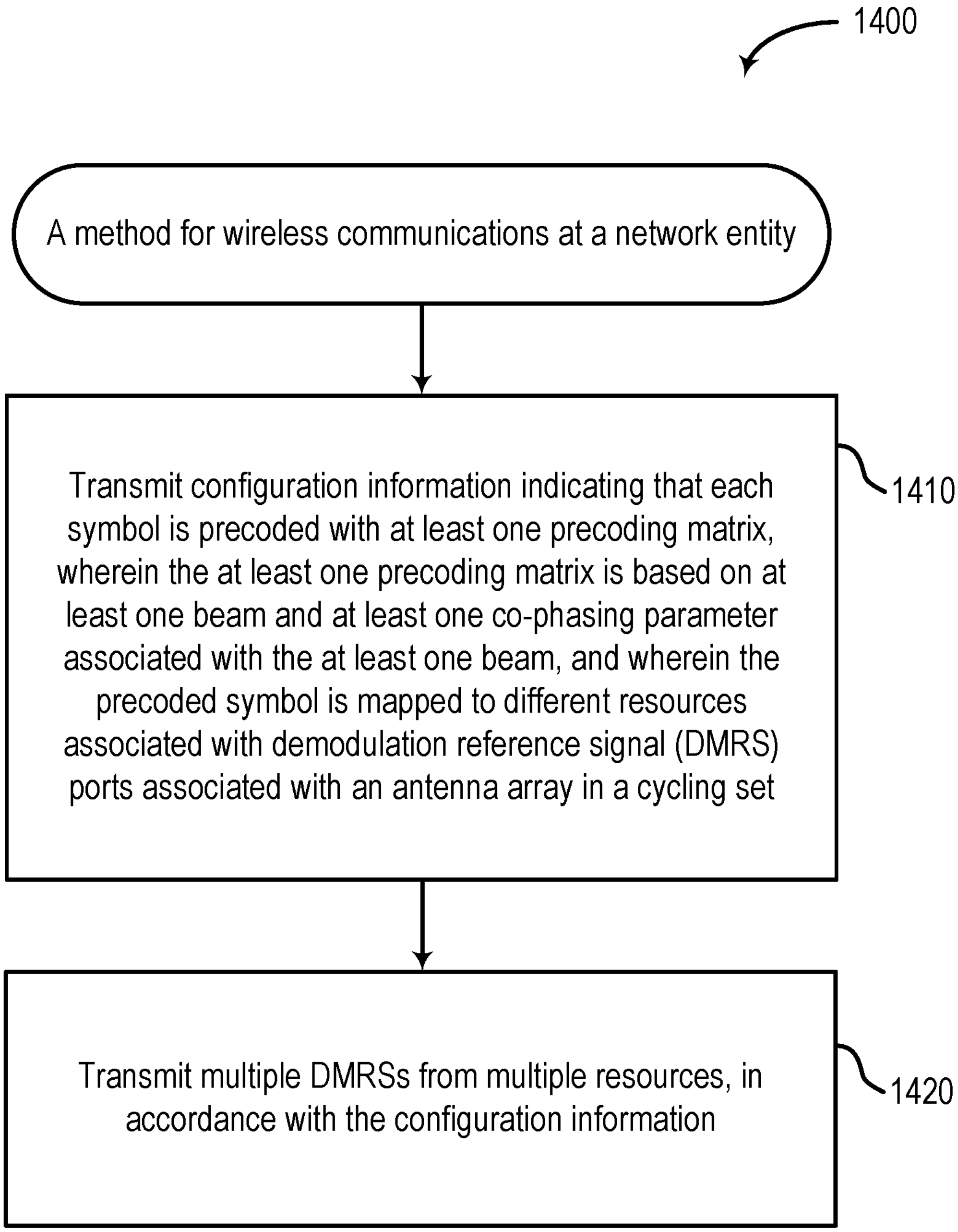
FIG. 14 depicts a method for wireless communications at a network entity.

FIG. 14 shows an example of a method 1400 for wireless communications at a network entity, such as the BS 102 of FIG. 1 and FIG. 3.

Method 1400 begins at step 1410 with transmitting configuration information indicating that each symbol is precoded with at least one precoding matrix. The at least one precoding matrix is based on at least one beam and at least one co-phasing parameter associated with the at least one beam. The precoded symbol is mapped to different resources associated with demodulation reference signal (DMRS) ports associated with an antenna array in a cycling set. In some cases, the operations of this step refer to, or may be performed by, circuitry for transmitting and/or code for transmitting as described with reference to FIG. 16.

Method 1400 then proceeds to step 1420 with transmitting multiple DMRSs from multiple resources, in accordance with the configuration information. In some cases, the operations of this step refer to, or may be performed by, circuitry for transmitting and/or code for transmitting as described with reference to FIG. 16.

In certain aspects, each resource corresponds to a resource element (RE) or a resource block (RB).

In certain aspects, the method 1400 further includes transmitting a configuration of a quantity of beams.

In certain aspects, a quantity of DMRS ports is based on at least the quantity of beams.

In certain aspects, each DMRS port is associated with one precoding matrix and one polarization.

Figure 16:
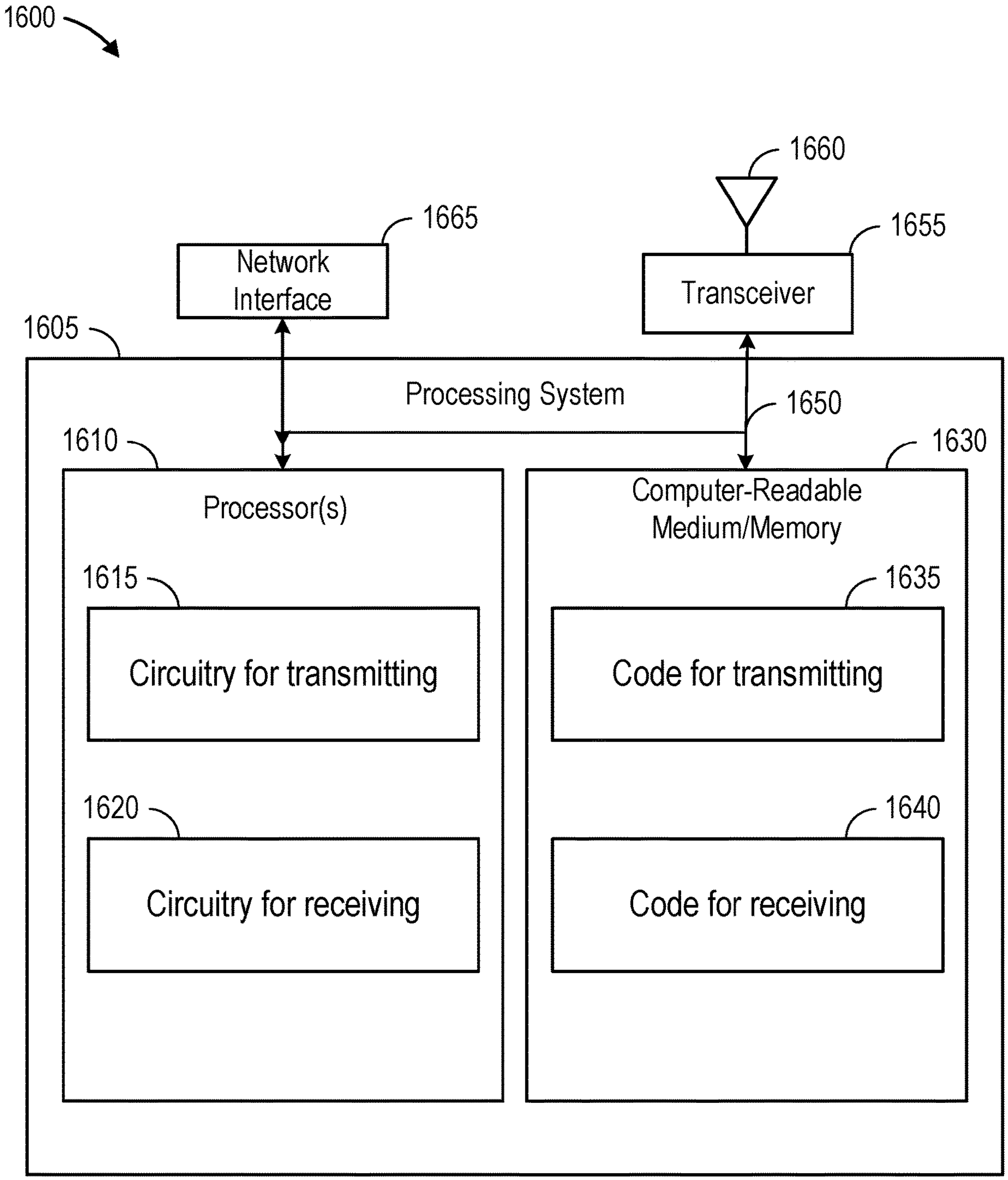

In one aspect, the method 1400, or any aspect related to it, may be performed by an apparatus, such as a communications device 1600 of FIG. 16, which includes various components operable, configured, or adapted to perform the method 1400. The communications device 1600 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment (UE), such as UE 104 described above with respect to FIG. 1 and FIG. 3.

The communications device 1500 includes a processing system 1505 coupled to a transceiver 1545 (e.g., a transmitter and/or a receiver). The transceiver 1545 is configured to transmit and receive signals for the communications device 1500 via an antenna 1550, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1525 via a bus 1540. In certain aspects, the computer-readable medium/memory 1525 is configured to store instructions (e.g., computer-executable code) that when executed by the one or more processors 1510, cause the one or more processors 1510 to perform the method 1300 described with respect to FIG. 13, and/or any aspect related to it. Note that reference to a processor performing a function of communications device 1500 may include the one or more processors 1510 performing that function of communications device 1500.

In the depicted example, at least one computer-readable medium/memory 1525 stores code (e.g., executable instructions), such as code for receiving 1530 and code for transmitting 1535. Processing of the code for receiving 1530 and the code for transmitting 1535 may cause the communications device 1500 to perform the method 1300 described with respect to FIG. 13, and/or any aspect related to it.

The one or more processors 1510 (individually or collectively) include circuitry configured to implement (e.g., execute) the code stored in the computer-readable medium/memory 1525, including circuitry such as circuitry for receiving 1515 and circuitry for transmitting 1520. Processing with the circuitry for receiving 1515 and the circuitry for transmitting 1520 may cause the communications device 1500 to perform the method 1300 described with respect to FIG. 13, and/or any aspect related to it.

Various components of the communications device 1500 may provide means for performing the method 1300 described with respect to FIG. 13, and/or any aspect related to it. For example, means for transmitting, sending or outputting for transmission may include transceivers 354 and/or antenna(s) 352 of the UE 104 illustrated in FIG. 3 and/or the code for transmitting 1535, the circuitry for transmitting 1520, the transceiver 1545 and the antenna 1550 of the communications device 1500 in FIG. 15. Means for receiving or obtaining may include transceivers 354 and/or antenna(s) 352 of the UE 104 illustrated in FIG. 3 and/or the code for receiving 1530, the circuitry for receiving 1515, the transceiver 1545 and the antenna 1550 of the communications device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 15 is an example, and many other examples and configurations of communication device 1500 are possible.

FIG. 16 depicts aspects of an example communications device 1600. In some aspects, communications device 1600 is a network entity, such as BS 102 of FIG. 1 and FIG. 3, or a disaggregated base station as discussed with respect to FIG. 2.

The communications device 1600 includes a processing system 1605 coupled to a transceiver 1655 (e.g., a transmitter and/or a receiver) and/or a network interface 1665. The transceiver 1655 is configured to transmit and receive signals for the communications device 1600 via an antenna 1660, such as the various signals as described herein. The network interface 1665 is configured to obtain and send signals for the communications device 1600 via communication link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to at least one computer-readable medium/memory 1630 via a bus 1650. In certain aspects, the computer-readable medium/memory 1630 is configured to store instructions (e.g., computer-executable code) that when executed by the one or more processors 1610, cause the one or more processors 1610 to perform the method 1400 described with respect to FIG. 14, or any aspect related to it. Note that reference to a processor of communications device 1600 performing a function may include the one or more processors 1610 of communications device 1600 performing that function.

In the depicted example, the computer-readable medium/memory 1630 stores code (e.g., executable instructions), such as code for transmitting 1635 and code for receiving 1640. Processing of the code for transmitting 1635 and the code for receiving 1640 may cause the communications device 1600 to perform the method 1400 described with respect to FIG. 14, or any aspect related to it.

The one or more processors 1610 (individually or collectively) include circuitry configured to implement (e.g., execute) the code stored in the computer-readable medium/memory 1630, including circuitry such as circuitry for transmitting 1615 and circuitry for receiving 1620. Processing with the circuitry for transmitting 1615 and the circuitry for receiving 1620 may cause the communications device 1600 to perform the method 1400 described with respect to FIG. 14, or any aspect related to it.

Various components of the communications device 1600 may provide means for performing the method 1400 described with respect to FIG. 14, or any aspect related to it. Means for transmitting, sending or outputting for transmission may include transceivers 332 and/or antenna(s) 334 of the BS 102 illustrated in FIG. 3 and/or the circuitry for transmitting 1615, the code for transmitting 1635, the transceiver 1655 and the antenna 1660 of the communications device 1600 in FIG. 16. Means for receiving or obtaining may include transceivers 332 and/or antenna(s) 334 of the BS 102 illustrated in FIG. 3 and/or the circuitry for receiving 1620, the code for receiving 1640, the transceiver 1655 and the antenna 1660 of the communications device 1600 in FIG. 16.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 16 is an example, and many other examples and configurations of communication device 1600 are possible.

Example Clauses

Implementation examples are described in the following numbered clauses:

Clause 1: A method for wireless communications at a user equipment (UE), comprising: receiving configuration information indicating that each symbol is precoded with at least one precoding matrix, wherein the at least one precoding matrix is based on at least one beam and at least one co-phasing parameter associated with the at least one beam, and wherein the precoded symbol is mapped to different resources associated with demodulation reference signal (DMRS) ports associated with an antenna array in a cycling set; and receiving multiple DMRSs from multiple resources, in accordance with the configuration information.

Clause 2: The method of clause 1, further comprising estimating a channel between the UE and a network entity based on measurements associated with the multiple DMRSs and the at least one co-phasing parameter.

Clause 3: The method of any one of clauses 1-2, further comprising calculating a log likelihood ratio (LLR) value for each resource based on an estimated channel and the measurements associated with the multiple DMRSs.

Clause 4: The method of any one of clauses 1-3, wherein each resource corresponds to a resource element (RE) or a resource block (RB).

Clause 5: The method of any one of clauses 1-4, further comprising receiving a configuration of a quantity of beams.

Clause 6: The method of clause 5, wherein a quantity of DMRS ports is based on at least the quantity of beams.

Clause 7: The method of any one of clauses 1-6, wherein each DMRS port is associated with one precoding matrix and one polarization.

Clause 8: The method of any one of clauses 1-7, wherein a transmission rank number is equal to one and the at least one precoding matrix comprises a single precoding matrix.

Clause 9: The method of any one of clauses 1-8, wherein a transmission rank number is more than one, and wherein a quantity of DMRS ports is based on at least a quantity of precoding matrices and the transmission rank number.

Clause 10: The method of clause 9, comprising receiving downlink control information (DCI) indicating the transmission rank number.

Clause 11: The method of clause 9, further comprising receiving radio resource control (RRC) signaling indicating the quantity of precoding matrices.

Clause 12: The method of clause 9, wherein a first subset of the quantity of DMRS ports are precoded with a first precoding matrix of the quantity of precoding matrices on a first polarization type, and wherein a number of the first subset of the quantity of DMRS ports is equal to the transmission rank number.

Clause 13: The method of clause 12, wherein a second subset of the quantity of DMRS ports are precoded with a second precoding matrix of the quantity of precoding matrices on a second polarization type, and wherein a number of the second subset of the quantity of DMRS ports is equal to the transmission rank number.

Clause 14: The method of clause 9, wherein the at least one precoding matrix is further based on candidate precoding matrices for a first polarization type and a second polarization type.

Clause 15: The method of clause 14, wherein the candidate precoding matrices are different for different transmission rank numbers.

Clause 16: The method of any one of clauses 1-15, wherein the antenna array comprises multiple antenna sub-arrays.

Clause 17: The method of clause 16, wherein each antenna sub-array is precoded with the at least one precoding matrix and mapped to one or more DMRS ports.

Clause 18: The method of clause 16, wherein the configuration information indicates that one or more co-phasing parameters are cycled with a phase value across the multiple antenna sub-arrays.

Clause 19: The method of clause 16, wherein a quantity of DMRS ports is based on at least a quantity of precoding matrices, a transmission rank number, and a quantity of the multiple antenna sub-arrays.

Clause 20: The method of clause 19, further comprising receiving downlink control information (DCI) indicating the transmission rank number.

Clause 21: The method of clause 19, further comprising receiving radio resource control (RRC) signaling indicating the quantity of precoding matrices and the quantity of the multiple antenna sub-arrays.

Clause 22: A method for wireless communications at a network entity, comprising: transmitting configuration information indicating that each symbol is precoded with at least one precoding matrix, wherein the at least one precoding matrix is based on at least one beam and at least one co-phasing parameter associated with the at least one beam, and wherein the precoded symbol is mapped to different resources associated with demodulation reference signal (DMRS) ports associated with an antenna array in a cycling set; and transmitting multiple DMRSs from multiple resources, in accordance with the configuration information.

Clause 23: The method of clause 22, wherein each resource corresponds to a resource element (RE) or a resource block (RB).

Clause 24: The method of any one of clauses 22-23, further comprising transmitting a configuration of a quantity of beams.

Clause 25. The method of clause 24, wherein a quantity of DMRS ports is based on at least the quantity of beams.

Clause 26: The method of any one of clauses 22-25, wherein each DMRS port is associated with one precoding matrix and one polarization.

Clause 27: An apparatus, comprising: at least one memory comprising instructions; and one or more processors, individually or collectively, configured to execute the instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), comprising:

at least one memory comprising instructions; and one or more processors, individually or collectively, configured to execute the instructions to cause the apparatus to:

receive configuration information indicating that each symbol is precoded with at least one precoding matrix, wherein the at least one precoding matrix is based on at least one beam and at least one co-phasing parameter associated with the at least one beam, wherein the precoded symbol is mapped to different resources associated with demodulation reference signal (DMRS) ports associated with an antenna array in a cycling set, and wherein each DMRS port is associated with one precoding matrix and one polarization; and receive multiple DMRSs from multiple resources, in accordance with the configuration information.

2. The apparatus of claim 1, wherein the one or more processors, individually or collectively, are configured to execute the instructions to cause the apparatus to estimate a channel between the UE and a network entity based on measurements associated with the multiple DMRSs and the at least one co-phasing parameter.

3. The apparatus of claim 2, wherein the one or more processors, individually or collectively, are configured to execute the instructions to cause the apparatus to calculate a log likelihood ratio (LLR) value for each resource based on an estimated channel and the measurements associated with the multiple DMRSs.

4. The apparatus of claim 1, wherein each resource corresponds to a resource element (RE) or a resource block (RB).

5. The apparatus of claim 1, wherein the one or more processors, individually or collectively, are configured to execute the instructions to cause the apparatus to receive a configuration of a quantity of beams.

6. The apparatus of claim 5, wherein a quantity of DMRS ports is based on at least the quantity of beams.

7. The apparatus of claim 1, wherein a transmission rank number is equal to one and the at least one precoding matrix comprises a single precoding matrix.

8. The apparatus of claim 1, wherein a transmission rank number is more than one, and wherein a quantity of DMRS ports is based on at least a quantity of precoding matrices and the transmission rank number.

9. The apparatus of claim 8, wherein the one or more processors, individually or collectively, are configured to execute the instructions to and cause the apparatus to receive downlink control information (DCI) indicating the transmission rank number.

10. The apparatus of claim 8, wherein the one or more processors, individually or collectively, are configured to execute the instructions to cause the apparatus to receive radio resource control (RRC) signaling indicating the quantity of precoding matrices.

11. The apparatus of claim 8, wherein a first subset of the quantity of DMRS ports are precoded with a first precoding matrix of the quantity of precoding matrices on a first polarization type, and wherein a number of the first subset of the quantity of DMRS ports is equal to the transmission rank number.

12. The apparatus of claim 11, wherein a second subset of the quantity of DMRS ports are precoded with a second precoding matrix of the quantity of precoding matrices on a second polarization type, and wherein a number of the second subset of the quantity of DMRS ports is equal to the transmission rank number.

13. The apparatus of claim 8, wherein the at least one precoding matrix is further based on candidate precoding matrices for a first polarization type and a second polarization type.

14. The apparatus of claim 13, wherein the candidate precoding matrices are different for different transmission rank numbers.

15. The apparatus of claim 1, wherein the antenna array comprises multiple antenna sub-arrays.

16. The apparatus of claim 15, wherein each antenna sub-array is precoded with the at least one precoding matrix and mapped to one or more DMRS ports.

17. The apparatus of claim 15, wherein the configuration information indicates that one or more co-phasing parameters are cycled with a phase value across the multiple antenna sub-arrays.

18. The apparatus of claim 15, wherein a quantity of DMRS ports is based on at least a quantity of precoding matrices, a transmission rank number, and a quantity of the multiple antenna sub-arrays.

19. The apparatus of claim 18, wherein the one or more processors, individually or collectively, are configured to execute the instructions to and cause the apparatus to receive downlink control information (DCI) indicating the transmission rank number.

20. The apparatus of claim 18, wherein the one or more processors, individually or collectively, are configured to execute the instructions to cause the apparatus to receive radio resource control (RRC) signaling indicating the quantity of precoding matrices and the quantity of the multiple antenna sub-arrays.

21. An apparatus for wireless communications at a network entity, comprising:

at least one memory comprising instructions; and one or more processors, individually or collectively, configured to execute the instructions to cause the apparatus to:

transmit configuration information indicating that each symbol is precoded with at least one precoding matrix, wherein the at least one precoding matrix is based on at least one beam and at least one co-phasing parameter associated with the at least one beam, and wherein the precoded symbol is mapped to different resources associated with demodulation reference signal (DMRS) ports associated with an antenna array in a cycling set, and wherein each DMRS port is associated with one precoding matrix and one polarization; and transmit multiple DMRSs from multiple resources, in accordance with the configuration information.

22. The apparatus of claim 21, wherein each resource corresponds to a resource element (RE) or a resource block (RB).

23. The apparatus of claim 21, wherein the one or more processors, individually or collectively, are configured to execute the instructions to cause the apparatus to transmit a configuration of a quantity of beams.

24. The apparatus of claim 23, wherein a quantity of DMRS ports is based on at least the quantity of beams.

25. A method for wireless communications at a user equipment (UE), comprising:

receiving configuration information indicating that each symbol is precoded with at least one precoding matrix, wherein the at least one precoding matrix is based on at least one beam and at least one co-phasing parameter associated with the at least one beam, wherein the precoded symbol is mapped to different resources associated with demodulation reference signal (DMRS) ports associated with an antenna array in a cycling set, and wherein each DMRS port is associated with one precoding matrix and one polarization; and receiving multiple DMRSs from multiple resources, in accordance with the configuration information.

26. The method of claim 25, further comprising estimating a channel between the UE and a network entity based on measurements associated with the multiple DMRSs and the at least one co-phasing parameter.

27. A method for wireless communications at a network entity, comprising:

transmitting configuration information indicating that each symbol is precoded with at least one precoding matrix, wherein the at least one precoding matrix is based on at least one beam and at least one co-phasing parameter associated with the at least one beam, wherein the precoded symbol is mapped to different resources associated with demodulation reference signal (DMRS) ports associated with an antenna array in a cycling set, and wherein each DMRS port is associated with one precoding matrix and one polarization; and transmitting multiple DMRSs from multiple resources, in accordance with the configuration information.

* * * * *